(12) United States Patent
Willard

(10) Patent No.: US 7,065,752 B2
(45) Date of Patent: Jun. 20, 2006

(54) METHOD AND APPARATUS COMPILATION OF AN INTERPRETATIVE LANGUAGE FOR INTERACTIVE TELEVISION

(75) Inventor: Pierre Willard, Palo Alto, CA (US)

(73) Assignee: OpenTV, Inc., San Francisco, CA (US)

( * ) Notice: Subject to any disclaimer, the term of this patent is extended or adjusted under 35 U.S.C. 154(b) by 706 days.

(21) Appl. No.: 10/061,902

(22) Filed: Feb. 1, 2002

(65) Prior Publication Data

US 2002/0120940 A1    Aug. 29, 2002

Related U.S. Application Data

(60) Provisional application No. 60/328,963, filed on Oct. 12, 2001, provisional application No. 60/279,543, filed on Mar. 28, 2001, provisional application No. 60/269,261, filed on Feb. 15, 2001, provisional application No. 60/267,876, filed on Feb. 9, 2001, provisional application No. 60/266,210, filed on Feb. 2, 2001, provisional application No. 60/265,986, filed on Feb. 2, 2001.

(51) Int. Cl.
    *G06F 9/45* (2006.01)
(52) U.S. Cl. ...................................... 717/140
(58) Field of Classification Search ................. 717/140
    See application file for complete search history.

(56) References Cited

U.S. PATENT DOCUMENTS

| | | | |
|---|---|---|---|
| 5,286,088 A * | 2/1994 | Taylor et al. ............... | 297/353 |
| 5,432,937 A | 7/1995 | Tevanian et al. ............ | 717/162 |
| 5,892,941 A * | 4/1999 | Khan et al. .................... | 703/22 |
| 5,963,934 A * | 10/1999 | Cochrane et al. .............. | 707/2 |
| 6,141,793 A | 10/2000 | Bryant et al. ................ | 717/115 |
| 6,188,401 B1 | 2/2001 | Peyer .......................... | 779/328 |
| 6,327,608 B1 * | 12/2001 | Dillingham ................. | 709/203 |
| 6,405,367 B1 | 6/2002 | Bryant et al. ................ | 717/115 |
| 6,732,330 B1 * | 5/2004 | Claussen et al. ............ | 715/513 |
| 2001/0047394 A1 * | 11/2001 | Kloba et al. ................. | 709/217 |

FOREIGN PATENT DOCUMENTS

| | | |
|---|---|---|
| EP | 0 778 522 | 3/1996 |
| WO | WO 01/03011 | 11/2001 |

OTHER PUBLICATIONS

International Search Report; PCT/US 02/02663; Mailed Apr. 22, 2003.

* cited by examiner

*Primary Examiner*—John Chavis
(74) *Attorney, Agent, or Firm*—Meyertons Hood Kivlin Kowert & Goetzel, P.C.; Rory D. Rankin

(57) ABSTRACT

A method and apparatus for extracting and compiling an interpretative language to implement functions such as those written as a script embedded in a HTML page in an interactive television environment. HTML pages are received from both broadcast and online. The compiler runs on a server. The compiled scripts run faster and require less processing power to execute. The scripts are extracted from HTML representing content stored at the server. The compiled script code is then transmitted from the server to a client device, through broadcast or online, for execution during content display at the client device. The compiled scripts run faster, require less processing power to execute, and run on client devices that do not have the interpreter for that language.

53 Claims, 11 Drawing Sheets

# METHOD AND APPARATUS COMPILATION OF AN INTERPRETATIVE LANGUAGE FOR INTERACTIVE TELEVISION

CROSS REFERENCED TO RELATED APPLICATIONS

This application claims priority from the USPTO provisional patent application entitled: "A Method and Apparatus Compilation of an Interpretative Language for Interactive Television" filed on Oct. 12, 2001, Ser. No. 60/328,963 which is hereby incorporated by reference; USPTO provisional patent application entitled "A System for Adaptive Control of Access, Content and Scheduling For Interactive Television" filed on Feb. 2, 2001, Ser. No. 60/265,986 which is hereby incorporated herein by reference; USPTO provisional patent application entitled "A System for Adaptive Control of Access, Content and Scheduling For Interactive Television" filed on Feb. 2, 2001, Ser. No. 60/266,210 which is hereby incorporated herein by reference; USPTO provisional patent application entitled "A System for Adaptive Control of Access, Content and Scheduling For Interactive Television" filed on Feb. 9, 2001, Ser. No. 60/267,876 which is hereby incorporated herein by reference; and USPTO provisional patent application entitled "A System for Adaptive Control of Access, Content and Scheduling For Interactive Television" filed on Feb. 15, 2001, Ser. No. 60/269,261 which is hereby incorporated herein by reference; USPTO provisional patent application entitled "A System for Adaptive Control of Access, Content and Scheduling For Interactive Television" filed on Mar. 28, 2001, Ser. No. 60/279,543 which is hereby incorporated herein by reference.

COPYRIGHT NOTICE

A portion of the disclosure of this patent document contains material (code listings and message listings) to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2001 OpenTV, Inc.

BACKGROUND OF THE INVENTION

1. Field of the Invention

The present invention relates to the field of interactive television content display and specifically to the extraction of an interpretative language, e.g., JavaScript's from text mark up language, e.g., HTML pages and the compilation of the JavaScript at a server for downloading and to a client device for execution on display of content provided by a broadcast, the Internet or cache in an interactive television display space.

2. Summary of the Related Art

Interactive television systems can be used to provide a wide variety of services to viewers. Interactive television systems are capable of delivering typical video program streams, interactive television applications, text and graphic images, web pages and other types of information. Interactive television systems are also capable of registering viewer actions or responses and can be used for such purposes as marketing, entertainment and education. Users or viewers may interact with the systems by ordering advertised products or services, competing against contestants in a game show, requesting specialized information regarding particular programs, or navigating through pages of information.

Typically, a broadcast service provider or network operator generates an interactive television signal for transmission to a viewer's television. The interactive television signal may include an interactive portion consisting of application code or control information, as well as an audio/video portion consisting of a television program or other informational displays. The broadcast service provider combines the audio/video and interactive portions into a single signal for transmission to a receiver connected to the user's television. The signal is generally compressed prior to transmission and transmitted through typical broadcast channels, such as cable television (CATV) lines or direct satellite transmission systems.

Typically, a set-top box connected to the television controls the interactive functionality of the television. The set-top box receives a broadcast signal transmitted by the broadcast service provider, separates the interactive portion from the audio-video portion and decompresses the respective portions of the signal. The set-top box uses the interactive information, for example, to execute an application while the audio/video information is transmitted to the television. The set-top box may combine the audio/video information with interactive graphics or audio generated by the interactive application prior to transmitting the information to the television. The interactive graphics and audio may present additional information to the viewer or may prompt the viewer for input. The set-top box may provide viewer input or other information to the broadcast service provider via a modem connection or cable.

In accordance with their aggregate nature, interactive television systems provide content in various different communication protocols that preferably can be understood by the client or viewer who receives the information from the broadcast service provider/network operator. Typically the client is a set top box with a processor possessing limited processing power and communication bandwidth. Translation of the various protocols is beyond the limited processing capability available in the typical set top box processor. Moreover, there exist multiple sources using a multitude of web authoring tools to create content. These sources tend to utilize the hypertext mark up language (HTML) as a standard with embedded JavaScript in the HTML pages. JavaScript are typically interpreted. Client devices typically possess limited processing power and bandwidth, incapable of interpreting and executing an interpretative language in a fast and efficient manner. Thus, there is a need for a robust client and server architecture, which eliminates the need for interpretation of JavaScript embedded in HTML code so that HTML encoded content can be displayed by the client or set top box processor without requiring an inordinate amount of processing power or communication bandwidth.

SUMMARY OF THE INVENTION

The present invention addresses the needs of the interactive television environment discussed above. The present invention provides a method and apparatus comprising software and hardware for accepting and extracting an interpretative language, such as JavaScript from an input language, such as HTML and compiling the interpretative language for display at a client device. A compiled JavaScript page common to a plurality of pages is sent only once and referenced as an external page by compiled pages, thus reducing the amount of data to be sent and associated bandwidth. The viewer or client can be a viewer at a (STB), a cellular telephone user, a digital assistant, a pocket PC or any other electronic reception device.

The present invention provide distinct advantage over known systems. The present invention provides for extracting scripts from an HTML page and compiling the scripts on a server, for execution on a client device, which is an improvement over known systems where a browser to interprets and executes the scripts on the same machine.

The present invention also gathers scripts for each language, for example JavaScript or any other script language, from an HTML document into a single package, for passing to the compiler, so that some of or all the scripts are compiled together. Scripts are embedded in HMTL documents in many ways. For example, between a pair of <SCRIPT> and </SCRIPT> tags, or as attribute value for event handlers. The present invention parses the HTML document, aggregates the script (for a specified language, e.g., JavaScript) into one package, and then calls the compiler. Some pieces of scripts (e.g., included scripts) may be compiled separately into different modules. All modules are sent to the client device for execution. This allows, for example, compiled scripts to be shared across different HTML pages. This means the compiler has an interface to compile included script that maybe different from the one to compile the main document scripts. Thus, it is easier and simpler to create a single compiled module.

The client device knows how to link and execute pieces of compiled scripts, as if it was a single script. Compiled scripts may be cached, so that compiling does not occur if the script is already in the cache. The present invention also provides a compile time marker in the scripts for code to be executed only on usual HTML browsers (ie, never executed in the client device). In prior systems enable the script to test at execution time which browser is running (Internet Explorer, Netscape, etc). In the present invention, the preferred compiler recognizes a keyword, e.g., "JS2O". Thus, in a piece of code like: "if (JS2O) DO_A; else DO_B" the compiler will not compile "DO_B" as it knows that "if (JS2O)" is always true. Thus, the entire piece of code is actually compiled as "DO_A;" The script compiler does not compile code that is never executed on client device, thus reducing the compiled code size, and improving code execution time. The compiler replaces some late binding references by compile time bindings for faster execution on client device. Prior systems resolve references at execution time. For example, in JavaScript, when accessing an identifier "foo", the script engine will look for the name "foo" in a scope chain. This takes time of course. Here the compiler binds (in some cases) the identifier "foo" to a specific address for fast access at runtime. For example, in JS2O, (some) properties are allocated memory space as regular global variables in C language, and (some) other properties are allocated slots in the stack as regular local variables in C. The compiler replaces some late binding references by absolute values for faster execution on client device. In this embodiment instead of binding to an address, the compiler replaces the identifier directly by a value. For example, in JavaScript, the identifier "NaN" is a property of an object. Here the compiler directly replaces references to "NaN" by its value.

The preferred compiler supports an interface to define new classes of objects. This enables the compiler to access and/or optimize creation and manipulation of those objects, and allows the runtime to link with the code for that class. The class code can be implemented as an Open TV module. In a preferred embodiment, H2O defines an HTML syntax to declare new classes of objects. The compiler supports an interface to define predefined/external instance of objects which enables the compiler to access and/or optimize manipulation of those objects, and allows the runtime to access those objects. Those objects are created outside of the script execution. In a preferred embodiment, H2O defines an HTML syntax to declare predefined/external instance of objects.

BRIEF DESCRIPTION OF THE DRAWINGS

Other objects and advantages of the invention will become apparent upon reading the following detailed description and upon reference to the accompanying drawings in which.

Figure 1:
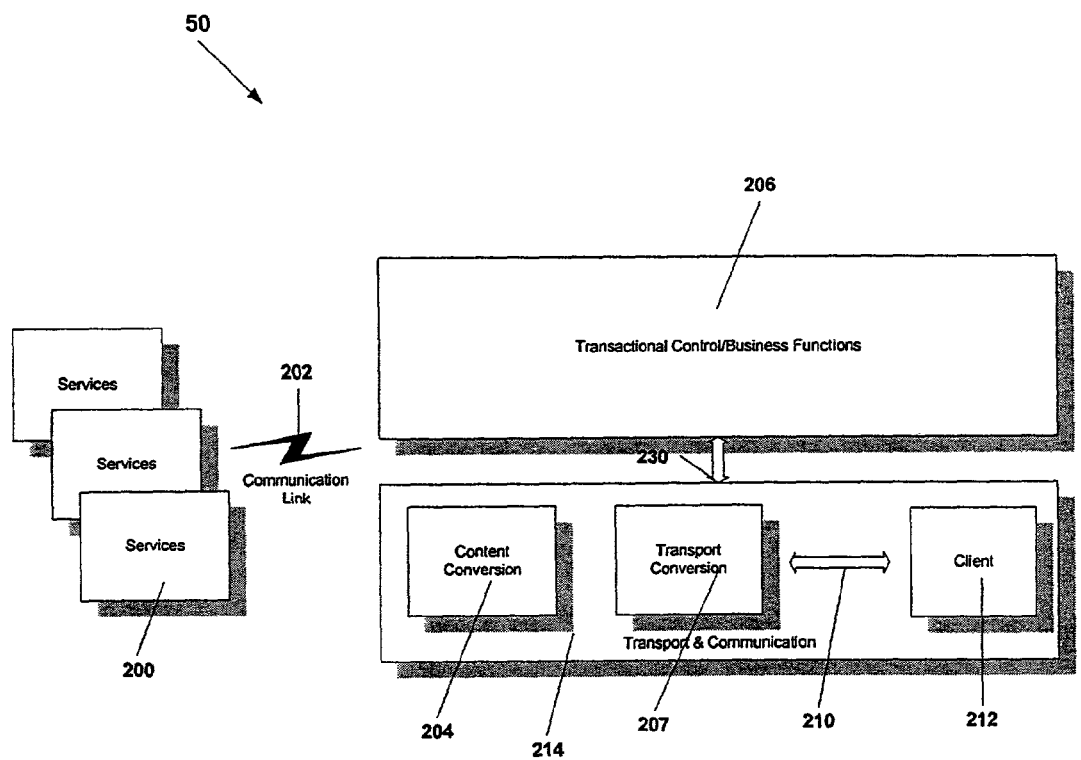
FIG. 1 is an illustration of a head-end providing content to a client device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF A PREFERRED EMBODIMENT

Turning now to FIG. 1, the Service Platform 50 comprises a group of applications roughly divided into three categories, Content Conversion 204, Transaction Control/Business Functions 206 and Transport Conversion 207. The Service Platform enables services 200 to interact with a client 212. The services 200 communicate through a communication link 202 to the Service Platform 50. The Service Platform 50 in turn communicates with a client 212. The client 212 may be a STB, a digital assistant, a cellular phone, or any other communication device capable of communicating with the Service Platform through communication link 230. The Content Conversion 204 and Transport Conversion 207 services provide the transport and communication function, and the Business Function services provide the Business Control functions.

Figure 2:
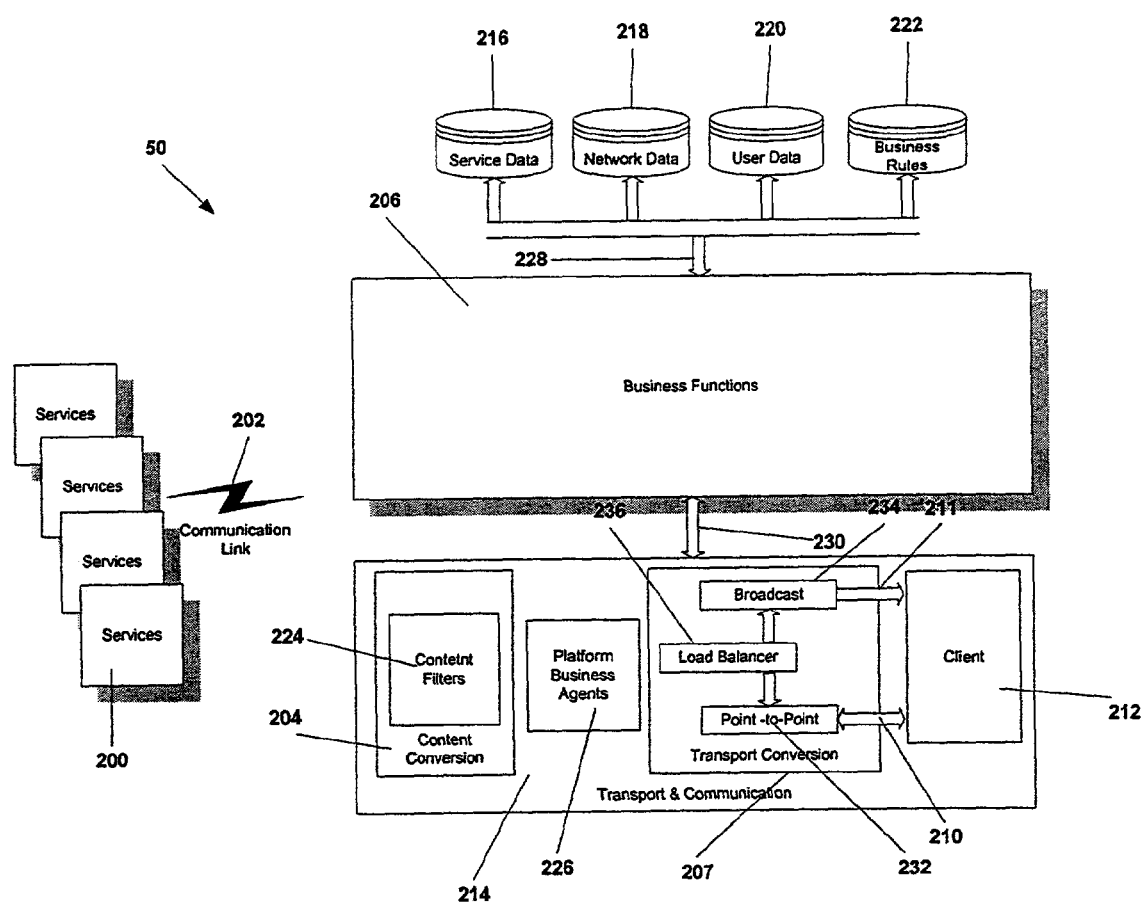
FIG. 2 is an illustration of a head-end providing content to a client device.
Figure 3:
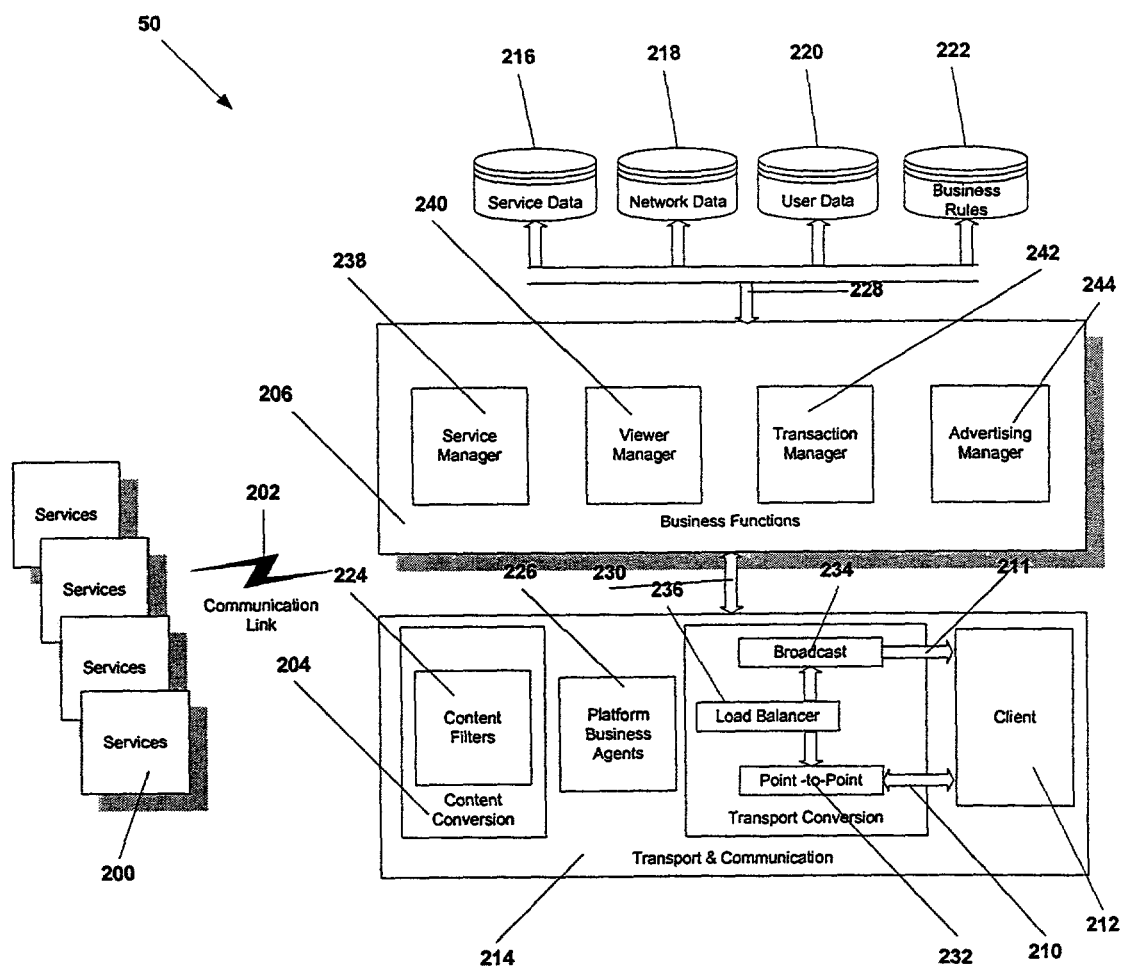
FIG. 3 is an illustration of a head-end providing content to a client device.

As shown in FIG. 2, transaction Control/Business Functions 206 are distributed between the Service Platform and the client 212. For example, a client can perform some business functions (e.g. implement advertising campaign rules and advertising/business filters to select advertisements viewed) and select contents, which are more suitable to the client 212 (e.g., select an advertisement or program which fits the user profile). The functions of FIG. 2 are expanded in FIG. 3. As shown in FIG. 3, the Business Functions 206 comprise four major functional components: Service Manager 238, Viewer Manager 240, Transaction Manager 242, and Advertisement (Ad) Manager 244. One example of a high-level operation flow for a preferred embodiment follows.

Referring now to FIG. 3, a Service 200 negotiates with a network operator to offer a service to subscribers via the Head-End operator's Service Platform. The network or Head End operator uses the Service Manger 238 to register the services and the negotiated business rules 222 (e.g. schedule, bandwidth requirements, service access to viewer information) associated with the service. The Service Manager 238 stores Service data 216 (e.g. URL address, content). Based on the business rules 222 and Service Data 216, Service Manager 238 communicates with the Broadcast Communication 234 function to retrieve the content from the content provider.

When the content is retrieved from the Service 200, it may be processed by the Content Conversion 204 and Content Filters 224 to convert the content into a form suitable for the client device 212. The Broadcast 234 function converts the content into a form suitable for the broadcast 234 network. The client 212 receives the converted content over broadcast link 211. Client 212 and Service 200 interact via Point-to-Point link 210 and Point-to-Point function 232, which are part of Transport Conversion 207. The service 200 may comprise shopping, audio/video, gaming, voting, advertisement, messaging, or any other service.

Client 212 communicates through Point-to-Point 232 communication link to the Service Platform 50 and Service 200. Load Balancer 236 interacts with the Business Functions 206 to determine the optimal load distribution between the Broadcast 234 Communication link 211 and the Point-to-Point 232 Communication link 210. The Platform Business Agents 226 use business rules 222 to control the interaction and exchange of information between the Service 200 and the client 212. For example, the network operator may choose to prevent Service 200 access to user information. Service 200 preferably pay a fee based on the Business Rules 222 and Service data 216 to access the user information.

Viewer Manager 240 stores client/user information in User Data 220. Platform Business Agents 226 control the flow of viewer information to the Service 200. Transaction Manager 242 records transactional information exchanged between the service 200 and Client 212. Based on the Business Rules 222 and the User Data 220, Advertising Manager 244 determines which advertisements and which type of advertisements will be presented to the client via Broadcast link 211 and Point-to-Point link 210.

Figure 4:
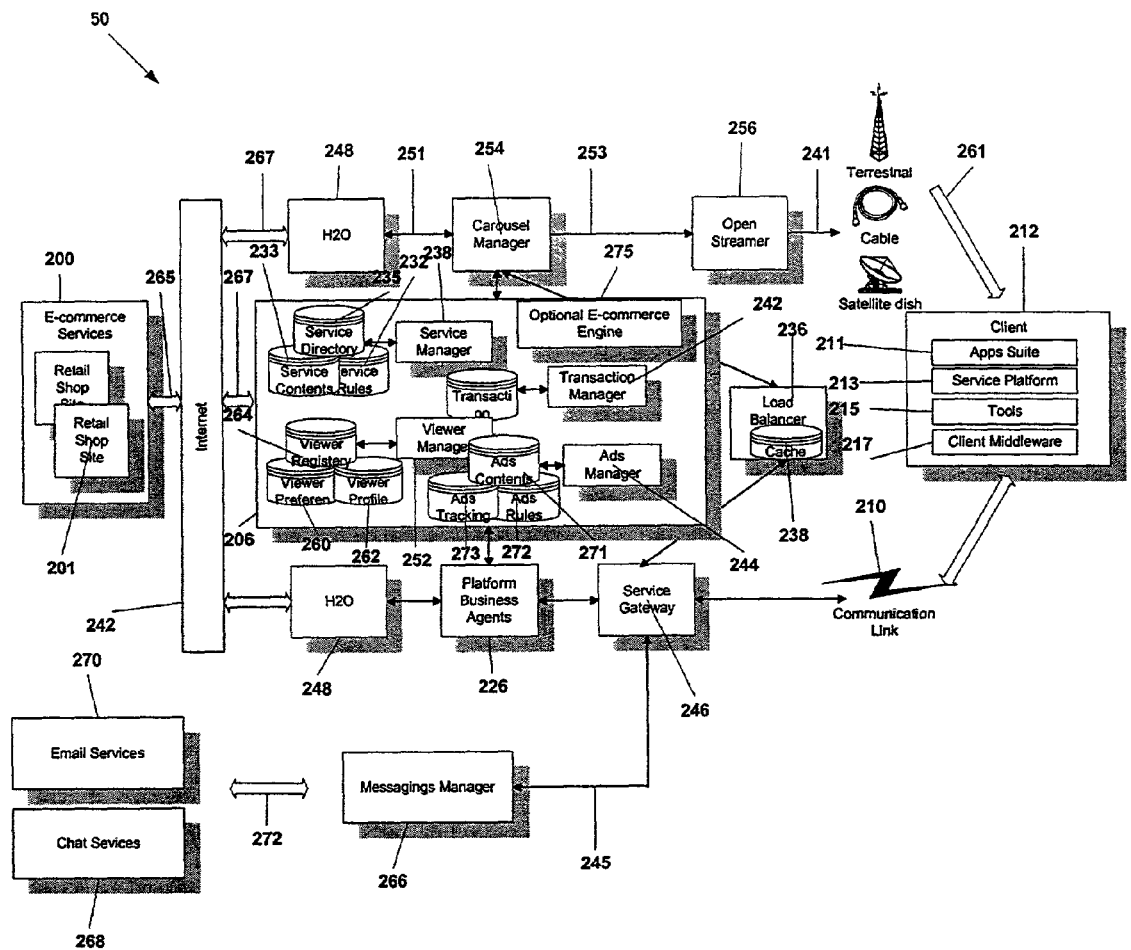
FIG. 4 is an illustration of a head-end providing content to a client device.

FIG. 4 illustrates another example of a preferred implementation of Service Platform 50. Services 200 provide shopping, chat, and other services either over the Internet or over another network or communication channel accessible to the network operator. Using the Service Platform, the network operator accesses those services. Business Functions 206, comprising Service Manager 238, interact with Carousel Manager 254 to retrieve content from a Service 200. The carousel comprises a repeating stream of audio/video/interactive data broadcast to clients from the Service Platform 50. Carousel manager 254, transaction manager 242 and Service Manager 238 control the content insertion and deletion from the broadcast carousel. Service content is retrieved, converted into a client suitable format by H2O 248. H2O 248 is a possible implementation of Content Conversion 204 and Content Filter 224. H2O converts HTML Content into Service Platform/Client readable content. The converted content is formatted into a data carousel and multiplexed by the Open Streamer 256 for broadcast to the client 212. Client 212 interacts with the services and if necessary communicates with the Service Platform and the Services 200. Point-to-Point communication goes through Service Gateway 246. Service gateway 246 performs transport conversion to convert the STB protocol into a form Platform Business Agents 226 and H2O 248 expect and understand. Load Balancer 236 interacts with Business Functions 206, Carousel Manager 254, and Service Gateway 246 to determine the optimal load between the Broadcast link 241 and the Point-to-Point Communication link 210. Business Functions 206 interact with the Platform Business Agents 226 to control access and information exchange between the Services 200 and client 212.

In a preferred embodiment of the present invention, H2O is a client/server solution, which enables Internet content developers to build interactive TV applications and services for network operators running the Service Platform. The Service Platform enables viewer access to the larger pool of Internet talent and content made available to the vast growing worldwide market of interactive TV applications. The H2O server process converts Internet content (HTML pages, ECMA Scripts, and HTML page formatting) into Service Platform assets. The H2O client process renders the assets and interacts with the client 212. In a T-Commerce/E-Commerce case scenario, H2O enables E-Commerce shops to utilize existing Web tools to create shopping services and to interface with the preferred Service Platform (operator), using standard Web protocol.

H2O acts as a proxy to the Service Gateway and the broadcasting tools to convert Web content. H2O receives HTML from both broadcast and online sources. The present invention enables web sites use their current HTTP servers and application servers to generate interactive TV content. In a preferred embodiment, H2O converts HTML, JavaScript, and Internet graphics to client compatible code, preferable Ocode, a C-based OpenTV code running on a virtual machine on the set top box. Any other known or developed protocol can also be added to the functionality of H2O. H2O enables the Service Platform to communicate with client's STBs that are not full browser capable and to create original user interfaces. H2O enables Service Platform connection to any commerce engine that uses only HTML. H2O is responsible for converting Web content such as HTML pages, JPG pictures, wave audio files, etc. into client-friendly resources that can be easily utilized with minimal processing capability and bandwidth at the client.

The server side of H2O is an HTTP proxy, H2OS. For other purposes, it can be packaged as a DLL or batch tool. The client side of H2O, an STB OCOD application, is H2OC. H2OC is built on top of other Service Platform client components, such as the Service Gateway library or the Carousel Load library. H2O enables URLs to be used to address documents and services. H2O enables tracking in the broadcast and online environments. H2OS provides HTTP proxy functionality. Service Platform applications request a document through H2O. H2O retrieves the document, parses it, compiles it, and returns the document to the requester. This H2O functionality enables use of the same engine for different uses, online and broadcast, facilitates scalability, and enables flexible use of H2O. The parsing depends on the type of document, e.g., H2O parsing can be HTML parsing, a GIF picture, or JPEG images, etc. To make it expandable, H2O provides function to "plug-in" and run new third party filters.

H2O supports special tags comprising: A/V control, channel control; on screen display (OSD) control; and Triggers. H2O Supported W3C tags comprise: controlled positioning of graphical elements (x, y, z). Javascript libraries comprise Math, DOM, and Date. The client side of H2O, H2OC composes graphics assets in the client or STB. H2O enables updated display of a user viewed page upon reception. H2OC utilizes libraries (communication, carousel, et al.) provided by other Service Platform components. H2O enables refreshing a page in a single update, but also provides an option to choose between partial updates as assets are loaded, versus waiting for all or some assets to load. H2O enables dynamic linking/unlinking of third party classes.

In broadcast mode, preferably, a global permanent object is provided, that is not cleared when starting a new page. The permanent object maintains context between pages. Other base objects provided by the Service Platform are also made permanent on transition (e.g., station control, OSD). Gadgets are client-defined methods. Gadgets are defined through an interface definition language to enable creation of new gadgets, modification of gadgets and to enable adding methods without modifying the JS2O compiler 4000 of the present invention.

Figure 5:
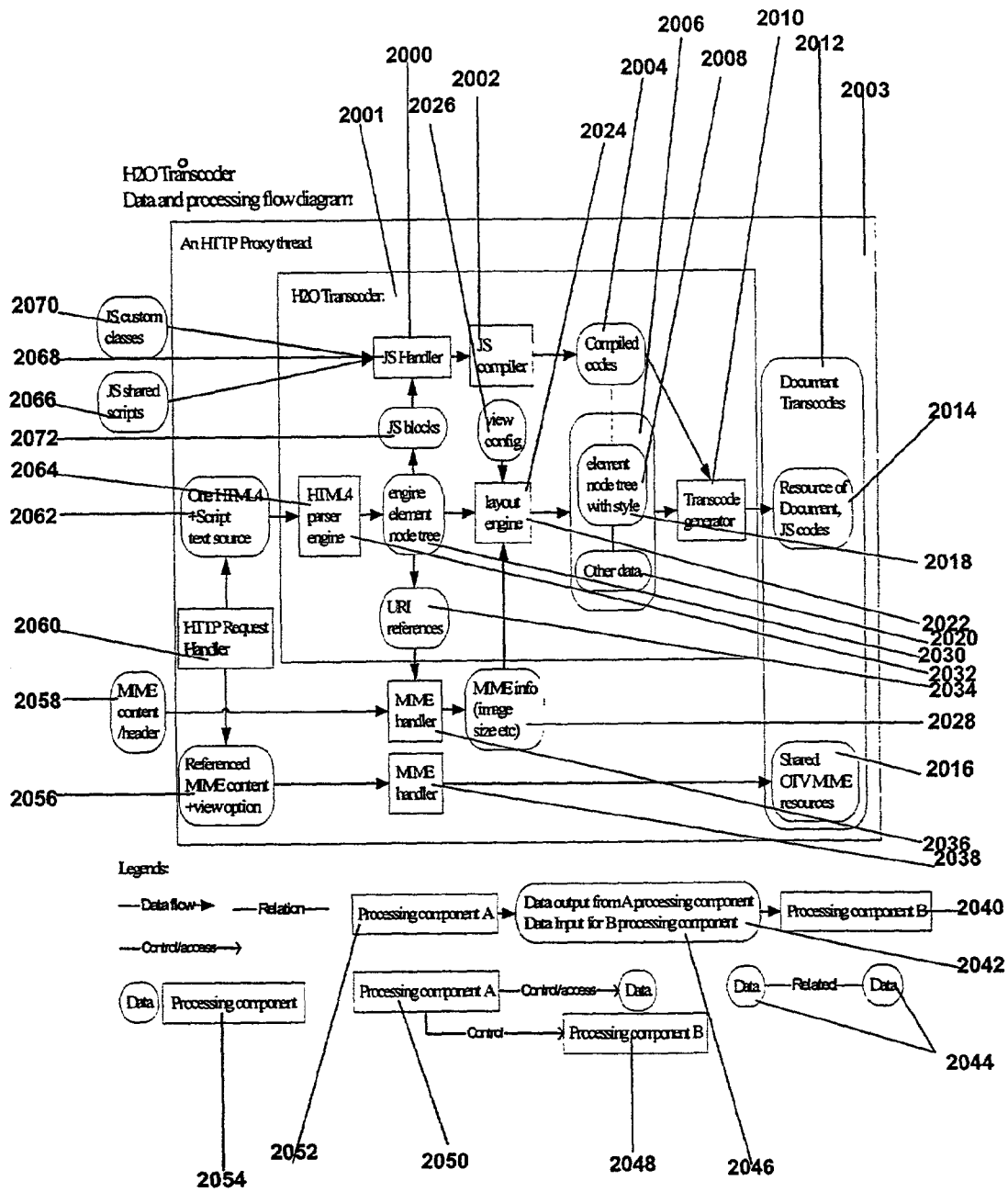
FIG. 5 is a H2O HTML Transcoder architecture diagram.
Figure 6:
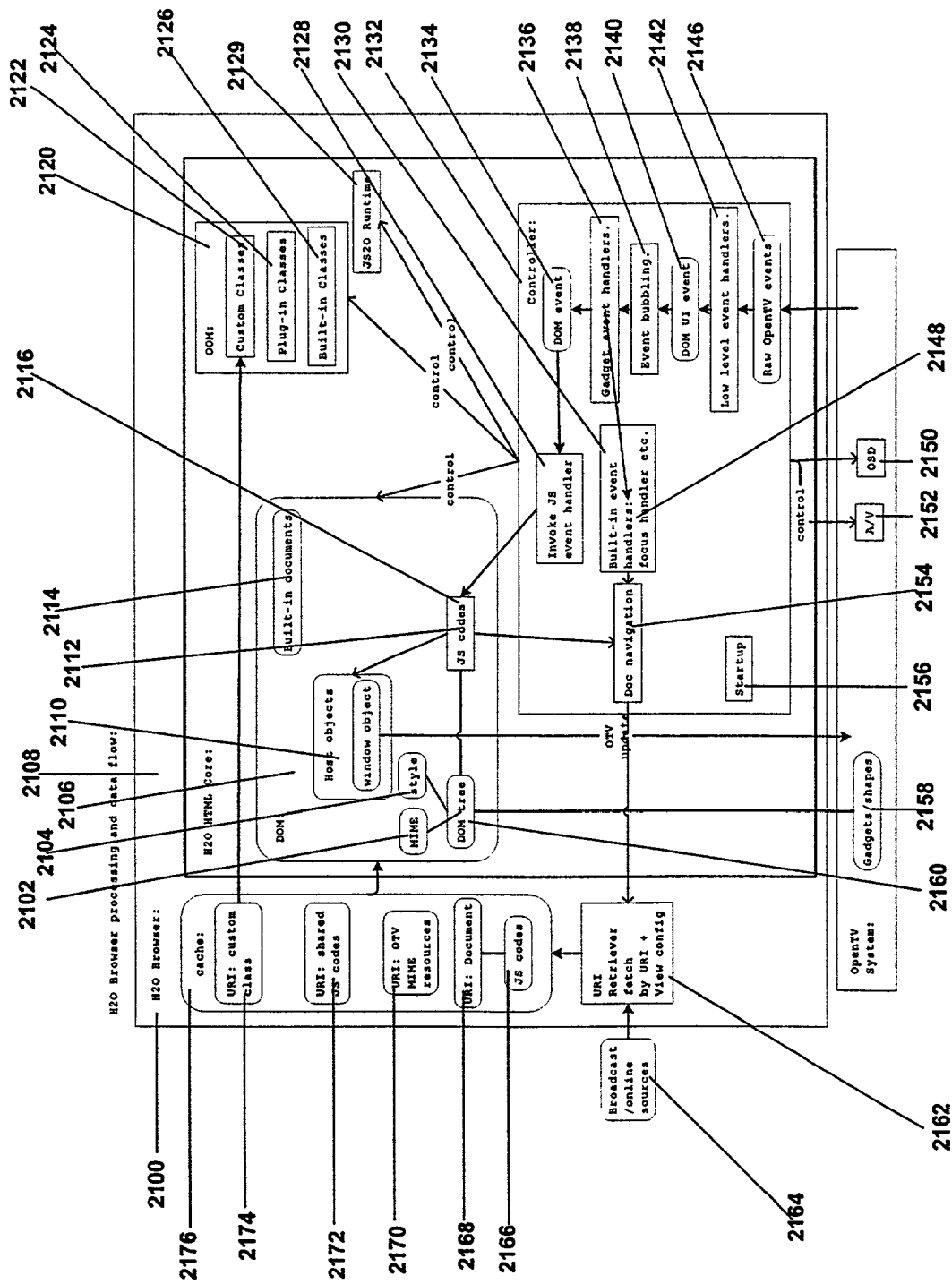
FIG. 6 is H2O Browser processing and data flow diagram.

Now turning to FIGS. 5 and 6, a discussion of the main H2O components follows. H2O transcoder 2001 converts HTML inputs 2062 into H2O transcodes that can be efficiently and interactively displayed by an H2O Browser in a client device, e.g., an OpenTV STB. The H2O Browser views H2O transcodes in limited Dynamic HTML4 fashion. The host, such as HTTP proxy 2003, invokes H2O Transcoder 2001. H2O Transcoder 2001 interfaces with MIME handler 2036 and MIME info 2028 for content information in non-HTML MIME type. The JS2O compiler 4000 is multi-thread safe. H2O Transcoder invokes H2O JavaScript Handler 2000 to take scripts as input, fetch external scripts or class URI, and invokes JS2O compiler and pre-link JavaScript. The JS handler 2000 processes JS custom classes 2070 and JS shared scripts 2066.

Turning now to FIG. 6, the H2O Browser 2100 interfaces with JS2O JavaScript runtime 2129 for JavaScript support. The H2O Transcoder runs as a task, fetches MIME content through host HTTP proxy, and processes MIME content as requested. Preferably an interface is provided with the proxy host to handle caching mechanism for better efficiency. The H2O transcoder executes synchronously.

The H2O transcoder supports a selected subset of the HTML4.01 W3 standard. H2O transcoder supports a subset of text: paragraphs, lines, phrases; subset of list; subset of table and subset of links. The H2O transcoder supports a subset of Object and Image elements. The H2O transcoder also supports a filter authoring-side object (e.g., IE (Internet Explorer) custom object) and supports runtime custom objects for the STB; both authoring-side (PC) and STB custom object class development; a subset of image map (client-side, server-side); a subset of form and form controls; Script element; and a subset of JavaScript.

In H2O transcoder, the HTML nodes contain once-computed CSS information in element nodes. Very limited, if any, additional CSS is preserved. This is fundamentally different from the dynamic cascading rules of CSS. Dynamic style is limited as a style change preferably is applied to only one node. This means that in order to query through DOM a property of the style of a particular element and expect it to return a valid value, the style property (e.g. style=color: red) is explicitly specified for the element inside an inline style, or explicitly created in a JavaScript code in order for PC emulation to behave similarly.

The present invention invokes a H2O JavaScript handler task to process Script element data. The JavaScript handler task fetches the script URI, and invokes the JS2O JavaScript compiler. JS2O returns a data package containing the compiled JavaScript code module. JS2O may cache compiled JavaScript scripts and matches repeated similar and identical JavaScript scripts.

The present invention generates H2O Transcodes using client compatible resources from parser engine internal data models with layout and limited style information, and JavaScript codes. A general specification of H2O Transcode format comprises transcode sections of client compatible resources that represent the document and JavaScript codes for the client or STB. The Transcode format contains information about the document in tree structure. The format is efficient, compact, and expandable. The format provides a version number to ensure conformance in the client or STB.

A client compatible object model, e.g., in a preferred embodiment, the OTV Object Model (OOM) is provided for a developer to create custom classes. The OOM provides a mechanism to develop a custom object class, load/register/unregister/unload class, and access class interface codes to manipulate custom objects. The design and implementation of OOM uses the JavaScript object model to avoid duplication of effort. The OOM provides an interface to enable JavaScript and C programs to manipulate objects. HTML, OOM, and C programs can also function without JavaScript. The present invention provides lightweight client-side class registry with selected naming scheme. The registry enables associating a class module with a name and lookup. OOM loads a class module and registers the module. There is only one interface for a class. The interface contains methods only. Each method is associated with a string name unique in this interface scope. The OOM provides a mechanism to create an object instance from a class and a Provide class referencing mechanism. OOM handles class unloading. OOM defines control flow and data flow between the H2O HTML and the JavaScript engine. OOM instantiates browser objects for the JavaScript engine. OOM exposes access of DOM objects to the JavaScript engine. An object of a class is an object whose method properties are methods of the class interface. The OOM defines interfaces, guidelines, and a subset of the SDK API for custom objects to be integrated into view structure, view update, event handling, focus, and access to shared system resources.

A controller directs browser behavior and components, and handles events. The controller provides fast startup time response, achieved by various techniques such as visual displaying while starting up. The preferred controller of the present invention uses system resources: event, download, mpeg, osd, A/V, etc. and controls data model and viewing. The Controller also handles raw and processes client (preferably OpenTV) events 2146. The controller handles primitive object events, which in turn generate a DOM event 2140, 2134. The present invention supports handling DOM event bubbling 2138 and uses focused node as a starting node. DOM events can be handled by the JavaScript event handler 2128 codes.

The preferred controller pre-defines element classes and thus is more efficient than custom classes. The controller using URI retriever, obtains URI content, makes HTTP: get and post (form post) requests, obtains responses and provides document open and back/forward functions. In a preferred embodiment, Data Models are mainly runtime HTML DOM, and other categories of runtime data models. HTML DOM also contains viewing information that reflects their intended effects.

Viewing preferably supports different color styles, and treats the color table as a shared resource. In a preferred embodiment, a limited set of MIME type handlers are provided depending on configuration to save memory. Popular HTML browsers for PC environments typically expose browser specific host objects for JavaScript runtime to manipulate. The present invention supports a subset of Microsoft Internet Explorer 5 (IE5) host objects for JavaScript runtime.

The present invention invokes the H2O JavaScript type handler (JS Handler). The JS handler traverses the element tree to collect JavaScript global code, functions, link references to external scripts, object class link references, and host codes (from event handler attributes). H2O invokes the H2O JavaScript handler and passes this collection to it. The JavaScript handler task fetches script and class MIME content, and invokes the JS2O JavaScript compiler which returns a client compatible code module containing the compiled JavaScript codes. The script collection carries back handles to codes. The function is invoked as shown in the software appendix.

The transcoder traverses the element node tree and generates client compatibly, e.g., OTV H2O Transcodes using the internal client compatible resource generator. The present invention configures components, display, startup, etc. Static and dynamic configurations are statically determined at compile time.

Figure 7:
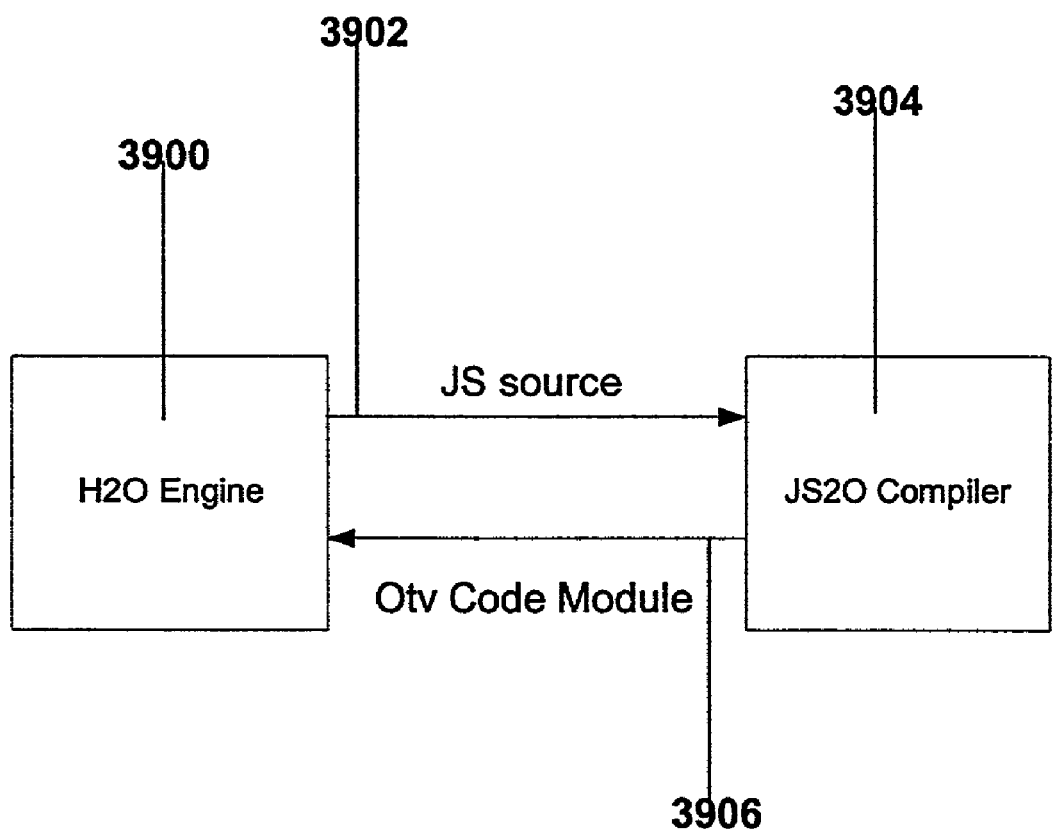
FIG. 7 illustrates an interface between H2O and JS2O.
Figure 8:
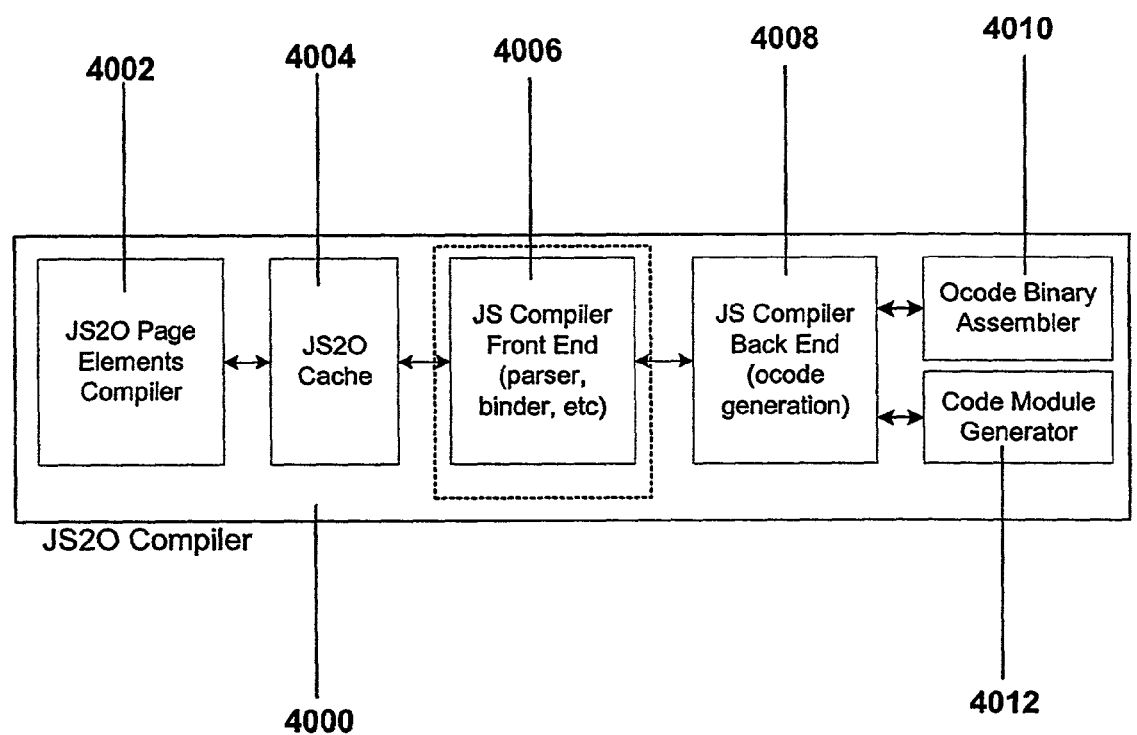
FIG. 8 illustrates the components of JS2O compiler.

Now turning to FIGS. 7 and 8, the JS2O compiler 3904 interfaces 3902 with the H2O 3900 engine to compile JS code into a client compatible code module 3906, preferably, an OpenTV ocode module. The JS compiler 4000 interfaces with the H2O engine using a C/C++ API as described below. The JS2O compiler is re-entrant and is divided in the following components: a JS2O Page Element compiler 4002, a JS2O Cache 4004, a JS2O Front End 4006 and a JS2O Backend 4008 Ocode Binary Assembler 4010 and Code Module Generator 4012. All compiler components are re-entrant and use memory buffers for passing data from one another.

Now turning to FIG. 8 and also referring to FIG. 5, an H2O filter 2064 extracts incoming Javascripts from incoming HTML pages 2062 and sends them to the Page Elements Compiler 4002 for aggregation within a single display page. H2O receives HTML pages from both the broadcast link and from online connection. The Page Elements Compiler 4002 receives JS elements from H2O 2030 (coming from an HTML page), internally gathers all elements for an HTML page into a single block of JS code, and then calls the JS Compiler 4000 to compile the JS page into a code module. A JS page is the aggregation of all JS code from one or more HTML pages. The interface 3902, 3906 between H2O and the JS2O Page Element Compiler is described below.

The JS2O optional Cache 4004 receives one JS page, and compares that page with other cached compiled pages. If cached, the cached page is used. If not already cached, JS2O calls the JS compiler 4006. Caching is preferably performed for the last 100 compiled pages. All JS2O compiler threads share the cache, thus, accessing the cache is protected. The JS Compiler Front End 4006 compiles the JS code first into an intermediary format, and then into an client compatible code module using the specific code generator 4012 for JS2O.

The JS Compiler Back End 4008 receives the entire JS page as a pre-parsed and pre-compiled tree. The JS Compiler Back End generates the client compatible opcodes, e.g. Ocode opcodes, directly in binary format uses the output from the Binary Assembler 4010. The JS Compiler Back End generates a client compatible code module in the Code Module Generator 4012. The client compatible binary assembler 4010, e.g., the Ocode (specific to OTV) binary assembler provides an API to generate client compatible binary opcodes. This assembler supports the opcodes needed by the JS compiler.

The present invention also creates, when an option is specified, a source assembly file. This file contains all debug information (.stabs) and the exact same code/data as the binary compiler. This assembly file can be compiled separately for those who want to debug JS page source code. The Code Module Generator 4012 provides an API to input the binary opcodes and output a client compatible code module 4102.

Figure 9:
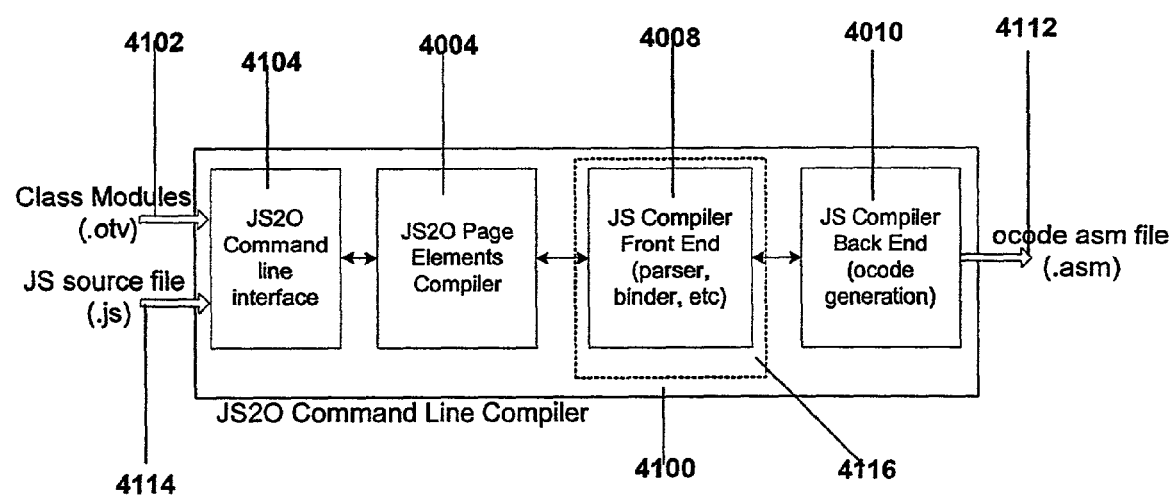
FIG. 9 illustrates the compiler as a JS2O command line compiler.
Figure 10:
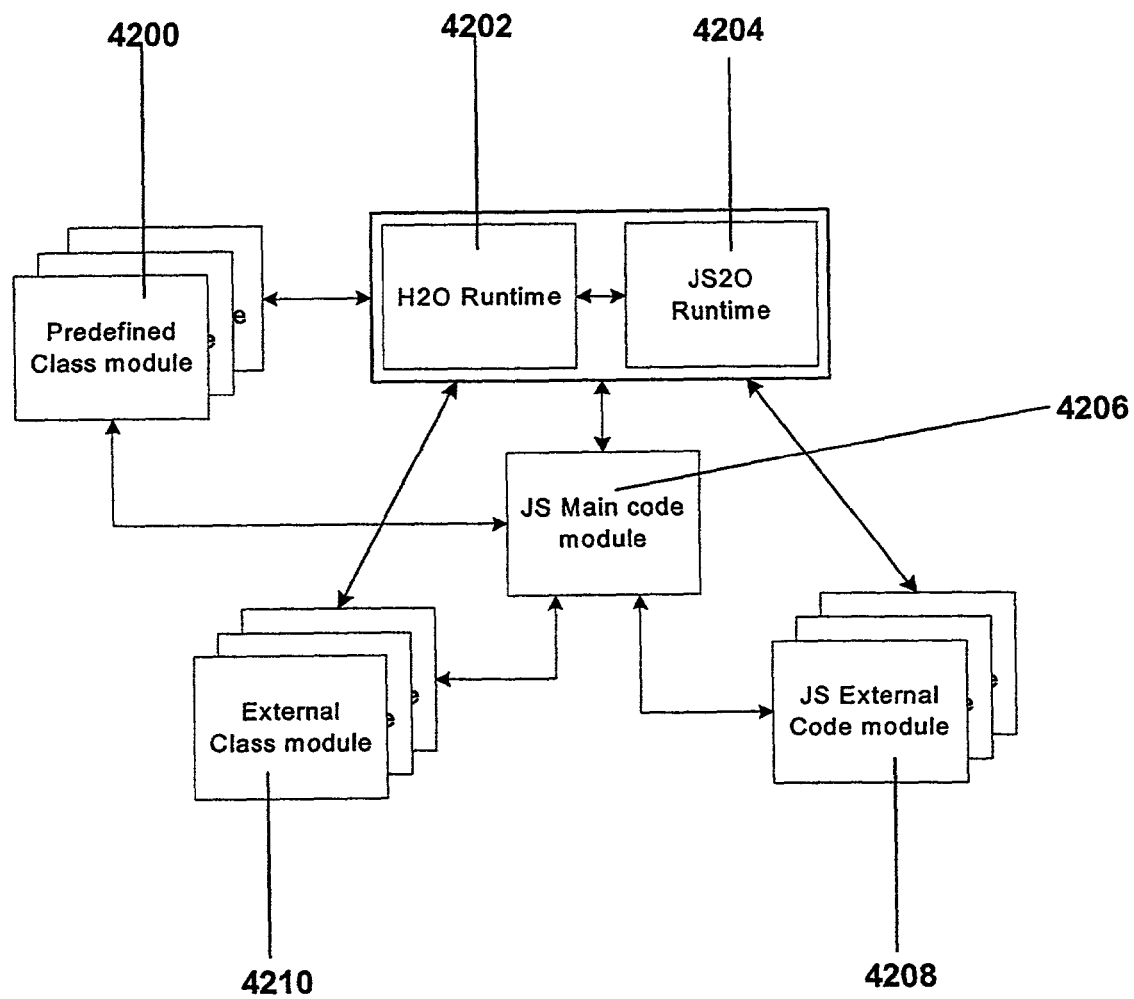
FIG. 10 illustrates execution of the compiled JS main code module at the client.

Preferably, the present invention also generates a client compatible module header (in memory) to hold Meta information. The JS2O compiler enables testing and acceptance of the JS compiler, and also enables testing of the client compatible, Ocode generator and of the Page Elements compiler 4002. Turning now to FIG. 9, in one mode of operation, the JS2O Command Line Compiler 4100 operates as a simple command line interface that takes a JS source file as input and outputs a client compatible Ocode assembly file 4112. The JS2O compiler can also optionally input an external object class definition.

The Command line interface 4104 communicates with the JS2O Page Elements compiler 4004 with the same API as H2O, i.e., (js2o_compile . . . API as defined in JS2O FFS). The following options are available for the command line JS2O compiler.

Js2o -g -O -i inputfile -o outputfile -c classmodule -p name classmodule

-i: input file, -o : output file, -g: generates debug information, -O: optimize, -c: defines external object class, "classmodule" is a client compatible code module with special header information, -p: defines a predefined object named "name" and of class defined by the "classmodule" code module.

The output file is compiled with a client compatible compiler, e.g., an Ocode assembler from the OpenTV Software Development Kit (SDK#) or with a C compiler front end (e.g., gcco). The Ocode Binary Assembler and the Code Module Generator work on the same binary object format. The SDK tools provide an 'a.out' format for the ocode object files.

The H2O runtime 4202 and JS2O runtime 4204 can be part of the same client compatible code module. In a preferred embodiment, the Predefined Class modules 4200 are the code for the built-in OOM and DOM object classes. The JS2O runtime includes the built-in JS classes. The JS2O compiler 4000 generates the JS Main code module 4206 and the JS External Code module 4208. External Class Module 4210 and other modules are preferably C modules.

JS2O provides a client compatible, e.g., Ocode library that is linked with all JS compiled code modules. This library is composed of small functions. Large functions are stored in the JS2O runtime module. For example an "add two integers" function is in the Ocode library, but a "generic add" function of any types is in the JS Runtime module.

All values pushed on the stack preferably are js2o type to accommodate garbage collection. It is possible in some cases to push some non-js2o values when certain that those values are popped before any garbage collection can occur. This is true when the compiler outputs a set of atomic instructions, as shown in the software appendix.

Garbage Collection

The garbage collector (GC) manages memory allocation for JS2O dynamic objects and strings. The GC starts fresh every time a new page is started (all the previously allocated memory is preferably discarded). The GC uses a mark and sweep algorithm. The mark value increases by one each time a new garbage collection is started. Thus, GC does not need a second pass to clear the marks.

The JS2O runtime engine creates objects and strings dynamically. Those are the ones being garbage-collected. The dynamically created objects and strings are referenced through variables (local or global), through temporary values in the stack, and through object properties. The mark and sweep algorithm has to go through all of them to mark the used items.

Page persistent objects are those, which are kept alive across multiple pages. Page persistent objects preferably do not hold a reference to a JS value (object or string or other) to avoid problems when switching pages when modules are unlinked. The page persistent objects preferably make their own copy of data.

Figures 11, 12:
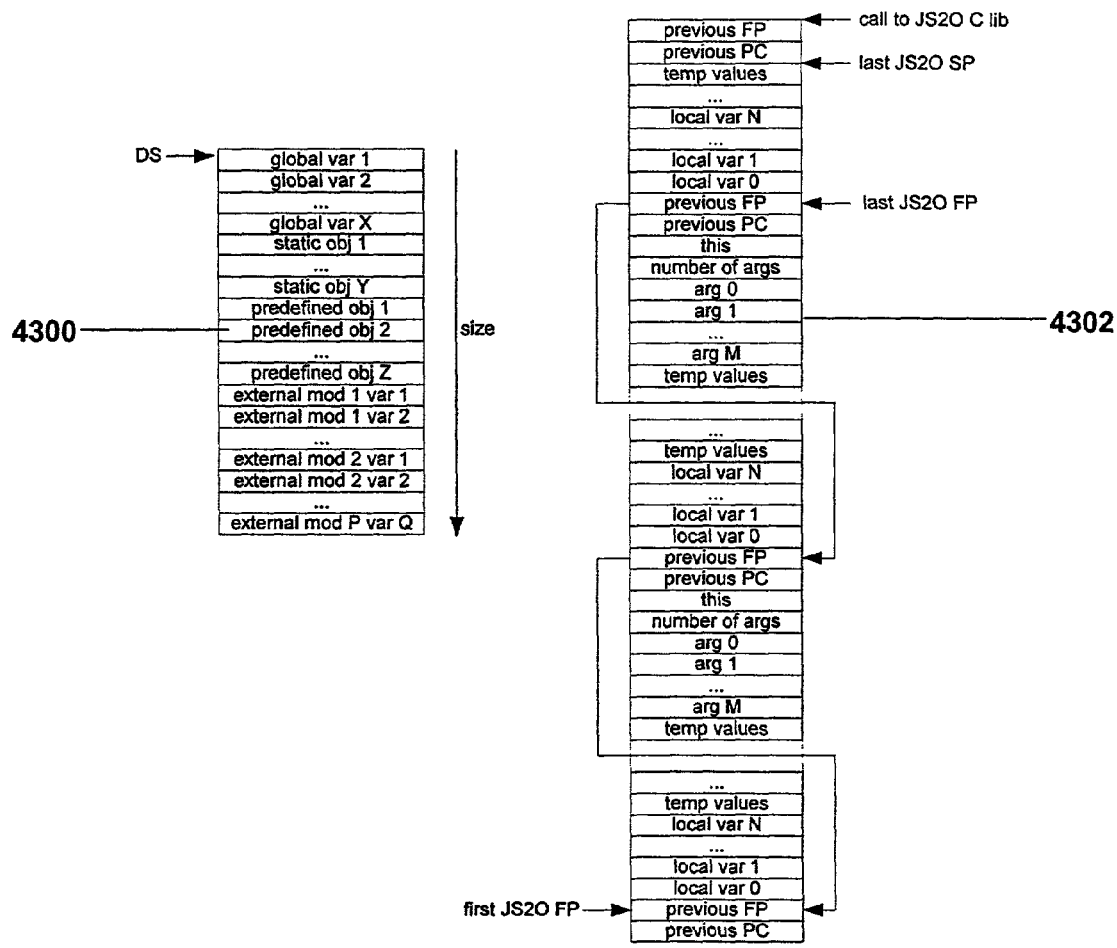
FIG. 11 illustrates a preferred data segment.
FIG. 12 illustrates a preferred stack segment.

Turning now to FIG. 11 and FIG. 12, JS global variables used in a page and objects referenced in a page (even predefined objects) are allocated (at compile time) a slot in the data segment 4300 of the JS code main code module. The local variables and parameters each have a slot in the execution stack. The compiler also generates intermediate values or "temp values" in the stack. The Mark algorithm goes through all those slots and marks all dynamic objects and strings, as well as recursively mark all objects and strings referenced in properties of any object.

The garbage collector provides an API, for example,
    void js2o_mark_val (js2o_val jsval, int markvalue);
    void js2o_gc_mark (int*js2o_fp, int*js2o_sp, int*js2o_first_fp, int markvalue).

The js2o_mark_val function marks the js2o value with the specified value. This function takes care of calling the object MarkProperties vtable function if the value is an object, and takes care of marking the prototype value, if any. The js2o_gc_mark function goes through all the JS globals and all the JS callstacks and marks all temporary values, locals, arguments and globals, as shown in FIG. 12. The GC also checks 'number of args' slots, but it does not make a difference in GC as they are ofjs2o_int types.

The present invention provides is a generic API to store dynamic properties in a single string. The API includes the property name and property index in that string for fast access to both. This code assumes a maximum number of 255 properties, and a maximum property name length of 127 bytes (not including last zero character).

Each property name is stored inside a single string in the format, "N-name/" where N is a single byte, which holds the index property number +1. Name is the property name itself. This format assumes that '/' and '-' are illegal characters for names. N contains an index from 1 to 255. The characters "/" and "-" can be replaced by any character not used in valid names and numbers.

The following function sets a property name to a specified value. If the property does not exist, it is added.
    void prop_set (js2O_prop* prop, char *name, js2o_val val);

The following function gets a property, specifying the name. If the property does not exist, it returns JS2O_NULL.
    Js2o_val prop_get (Js2o_prop* prop, char *name);

The following function removes a property, specifying the name. If the property does not exist, nothing happens.
    Void prop_remove {js2o_prop* prop, char *name);

The following function gets the name of a property, specifying an index. (0 to n). The function returns JS2O_NULL if this index does not exist. This function assumes that it is called with consecutive index number, starting from 0.
    js2o-val prop-index_get_name (js2o_prop* prop, int index).

The following function marks all properties with the specified maker value, used for garbage collection.
    void prop_mark (js2o_prop* prop, int markvalue);

The following function frees all memory used internally by this property list.
    void prop_free (js2o_prop* prop).

The js2o runtime provides the following APIs:
    js2o_obj *js2o_funcobj_create (js2o_obj *this, void *func);

This function creates a function object with the specified 'this' pointer and function address. Every time the function is called, the specified 'this' pointer is passed as the first parameter.
    void js2o_funcobj_delete (js2o_obj *objf);

This function deletes a function object. It actually does not delete it. The deletion will be done by the garbage collection later if no one references this object. The function resets the object to null values, so that it is safe to access this object (optionally generates runtime warning or error, but will not crash trying to execute non-existent code).
    void js2o_to_null_object (js2o_obj *obj, size_t size);

This function is used to change an existing object into an object of type JS2O_NULL_OBJECT. The size ensures that the original object is large enough to be transformed into a null object. This function can also be used to safely 'remove' an object, which might be referenced by some variables.
    js2o_val js2o_dstr_create (char *str);

This function creates a JS2O string type having the string char specified. The string is copied here.
    js2o_val js2o_dstr_create_static (char *str);

This function creates a JS2O string type with the string char specified. The string is not copied here. It is assumed that the str pointer is valid.

The JavaScript language in JS2O is a subset of ECMAScript Language ECMA-262. Some unsupported features in JS2O are ones, which would require compilation on the client device. Other feature support considerations are runtime speed, including compiler optimization possibilities, runtime size, and usefulness in an STB/client device environment. The following JS features are not supported in JS2O in the present example of a preferred embodiment.

RegExp class, Eval function, Nested functions definition, Call object, Argument object, "with" statement, Function constructor with dynamic arguments or body, Watch/unwatch methods, _parent_and _proto_ (Navigator features), ImplicitThis attribute, ImplicitParents attribute, Try/Catch/Throw statements and all error objects, other selected methods and properties of the predefined JS objects.

In a preferred embodiment, the following limitations are implemented in JS2O, however, different parameter or limitation values can be selected as desired. Property name maximum length: 127 bytes (not including last null character); Maximum number of properties per a single object: 255; Integer values are 29 bits signed (−268435456, #+268435455); and Float values are 31 bits.

The return value of a constructor (if any) is discarded if the constructor does not return a different object. Dynamic objects do not overshadow predefined objects. The name of those predefined objects are reserved words. Functions statically defined cannot be overshadowed by other functions (meaning that those methods are read-only properties of the global object). A limited set of names is reserved. All names starting with JS2O, with or without underscores prefix are reserved. Some functions will not be accessible as JS objects, e.g., predefined global functions.

The runtime execution of a JS2O script has preferred behavior:

Exception handling: a runtime error might either do nothing, or stop the JS execution, or even stop the page rendering. Computation overflow: the runtime does not test the overflow of integer.

The following JS objects are supported by JS2O.

Object; Math; String; Number; Boolean; Array; and Function. JS2O includes support for predefined client compatible specific objects, like OSD, Channels, etc. The window object has "event", "document" and "navigator" properties that are objects themselves. The window object has many methods (e.g., back ( )). All properties and methods of the window object are directly accessible.

The H2O (HTML to client compatible code, e.g., Ocode) engine converts multiple HTML pages to client compatible format, e.g., OpenTV format in parallel. Having a reentrant JS compiler simplifies the interface and improves the performance. The compiler is reentrant and in order to perform as many optimizations as possible, the compiler compiles all JS code from a single HTML page in one compilation.

In order to perform the optimization for JS2O and other functionalities, the compiler provides the following features: The compiler gives specific error messages for unsupported features and limitations, and parses the whole file before starting code generation (needed in particular for function called before its definition). A compiler reference to a function preferably differentiates between functions defined in the current compilation, functions defined globally and others.

Function objects: to differentiate as to access to the object or a call to the function, reference to a variable is differentiated as to local variables, global variables, and other variables. The Compiler enables determination as to whether a name refers to a known function, or a known variable. A Debug option is provided preferably to turn on or off debug messages. Optimization options are provided to turn on or off various compiling optimizations. The compiler issues warnings if a function call is missing some arguments.

Variable types: in some cases, the compiler knows the type of a variable being used. The compiler maintains the type of variables in the code. The type can also be 'Unknown'. The Compiler maintains Meta data (source file, line number, etc) so that the code generator can output debug information for program and data. In particular, the compiler provides statically compiled access to the following: local variables, global variables (defined in current compilation), functions (defined in current compilation), and predefined objects and their properties. The compiler provides an interface for importing predefined objects definition. Note that because there is no 'Block Scope' inside a JS function (all local variables defined in a function are valid throughout the function, regardless where they are declared), the compiler reserves space for all the local variables inside the function prologue. By default all variables have the value JS2O_UNDEFINED. The compiler prologue sets the value of all local variables. All 'uninitialized' global variables are set to that value.

The JS2O compiler provides an API with the H2O parser, as shown in the software appendix.

This API is multithread safe. The order in which those APIs are called is obviously important to ensure orderly code generation.

The method "js2o_compile_create" creates a compilation handler; filename is the name of JavaScript source file. This filename is used only for error messages. Compiled options are for the compiler (e.g., optimization, external file, debug, etc). The function returns NULL if error. The method "js2o_compile_destroy" destroys the handle and frees all related memory. The method "js2o_compile_generate" performs the actual compilation of all the pieces registered into one compiled chunk. After this, only js2o_compile_error_msg or js2o_compile_destroy should be called. The compiled data preferably comprises an Open TV code module (in binary format). The method "js2o_compile_error_msg" returns latest error message, suitable for an fprintf on stderr. The error message is freed after a call to js2o_compile_destroy.

The method "js2o_compile_warning_callback" registers a callback function for warning messages, 'callback' is a pointer to a callback function, and 'data' is a value, which will be passed to the callback function. The prototype for the callback function is 'void func (void *data, char *msg, js2o_handle jh)'. The warning message is destroyed after the callback call. Register a null callback to remove a callback. By default, there is no callback function.

The method "js2o_compile_add_src" adds a piece of text code to the compilation, "linenum" is the line number of the first line of this code, and we assume this is from the file specified in js2o_compile_create. The handle parameter is used for event-handler code: in that case handle is a pointer used to return a handle value. This handle value is preferably used at runtime to execute this code (see also js2o_execute). In other cases, i.e., not an event handler, the handle is null. This function maintains an internal copy of the code.

Optimization: for multiple event-handlers using the same code, js2o generates one instance of the handler code. The code preferably has all the new-lines (\n characters) from the original source file, so that line numbers are meaningful.

The method "js2o_compile_add_bin" includes a pre-compiled js2o file. Any global statements in the precompiled file are executed at this place at runtime. The name is used by JS2O to locate the external module at runtime. If the same file is included in several places in an HTML page, this API is preferably called each time with the same name. The module points to the client compatible code, e.g., an Open TV code module (including header).

The method "js2o_compile_add_obj" defines a predefined object available. "objname" is the name of the object. The class is defined by the client compatible code, e.g., .otv module (including header) pointed to by "classmodule". The module is not referenced at runtime by JS2O (the object is created by H2O). Note that this API does not define a new class accessible from JS source code.

The method "js2o_compile_add_class" defines a predefined class available. The class is defined by the client compatible code, e.g., .otv module pointed by classmodule. The class name (to be used in the 'new' JS statement) is also specified inside the module (module header). The class name is used at runtime by JS2O to obtain the function constructor of this class.

The method "js2o_compile_add_element" defines a new DOM element. This will add a global variable with the name specified. The function returns a variable handle. This handle is used at runtime by H2O to initialize the address of that object. An external JavaScript source file may be included in the HTML page. H2O compiles this JS source file before compiling the HTML page itself. What H2O finally passes in the js2o_compile_add_bin API (for compiling the JS code inside the HTML page) is the already compiled JS file. To compile an external source file, the H2O engine calls the js2o_compile_API with the following caveat: a special option 'external ref' is used in js2o_compile_create. The API does not include an external file (no call to js2o_compile_add_bin).

The JS2O compiler preferably maintains a cache of previously compiled JS pages (in memory), e.g., the last 100 pages. Caching is performed inside JS2O because some pages will have different HTML but the same JS script embedded inside HTML. Thus the present invention caches the compilation of such JS code inside JS2O. Here a JS page is simply the aggregation of all JS code from one HTML page. Note that the http proxy inside H2O also implements caching. Caching of a JS page enables use of a common JS between a plurality of display pages. This reduces the amount of data required to be sent to the STB or client.

JS code is encapsulated inside a client compatible code module, e.g., an Open TV code module. In the case of HTML+JS, the client compatible code module, e.g., Open TV code module preferably is embedded inside the H2O resource (as a "big char" array). The code module format enables source code debugging. The compiler outputs the debug information in an .odb file. Note however that the debugger does not know the JS2O types. Preferably support is provided in gdbo for the JS2O types. JavaScript code is used inside an HTML page in several ways: JavaScript code can be embedded inside an HTML page using one or more pair of <SCRIPT></SCRIPT> tags. The syntax is preferably: <SCRIPT LANGUAGE="JavaScript"> any JavaScript statements . . . </SCRIPT>

All inline code and event-handlers of a page are compiled into a single main client compatible, e.g., Open TV module. H2O and JS2O support the reference to an external JavaScript file. In H2O, an external JS source file is compiled, stored and loaded separately to enhance performance. This enables sending a single piece of code, even if this file is used in many pages. It is allowed to include the same file in a single HTML page. J2O precompiles the external JS files before compiling the main JS code. An external file is compiled into a DLL client compatible, e.g., Open TV module.

The corresponding HTML syntax is: <SCRIPT SRC="URI" LANGUAGE="JavaScript"></SCRIPT>, where "URI" points to a JavaScript source file.

An external JavaScript source file can contain any valid JS statements, however, name conflicts with the other running JS modules are possible. For example, multiple "vary x;" statements are problematic from conflict standpoint, but multiple "x=value are not". Global Code Linkage: the file is compiled into a module. The module exports a function that contains all the global code. This function is called at runtime, as if the external code was "inlined."

Variables Linkage: The precompiled file preferably exports all global variables being used by its code, either external (e.g., y=5), or internal (e.g., var x=4). The compiled main JS code reserves some slot in its global variables for all those exported variables. The precompiled code also includes slots for its exported global variables, but those slots actually hold pointers to the actual variables in the main code. The addresses are initialized at runtime.

Module Linkage: At runtime, H2O loads the precompiled module, creates a JS2O context, and then initializes the precompiled module (see js2o_dll_init). This initialization performs the addresses update of variables from the main JS code to the precompiled module. The name specified in js2o_compile_add_bin is used to reference the module at runtime.

H2O and JS2O support reference to an external precompiled file. The corresponding HTML syntax is:
<SCRIPT SRC="URI" LANGUAGE="Open TV"></SCRIPT>,
where "URI" points to a client compatible, e.g., Open TV JS code module file. This code module defines and supports specific JS2O requirements. Linkage is the same as for an External JS Source File. A segment of JS code can be specified as the value of an HTML attribute (e.g., onClick) to be executed when a specific event occurs. In ECMA terminology, this is a 'host code'. The syntax is:
OnAttribute=" any JavaScript statements"

All inlined code and event-handlers of a page are compiled into a single main client compatible module, e.g., Open TV module. An event handler can return True, False or other status value. For linkage, JS2O, at compile time, js2o_compile_add_src returns a handle to H2O for that event handler. This handle is used at runtime to reference the event handler code. JS code can access client compatible objects, e.g., Open TV predefined objects (including DOM objects). There is no declaration needed in the HTML pages.

For linkage, at runtime, H2O preferably passes an array of predefined object addresses to JS. The list and order of the predefined objects in that array is predefined (known to both H2O and JS2O). H2O preferably also passes an array of global functions. Those global functions can implement methods for predefined objects (e.g., SetVisibility method).

The following syntax example can be used to declare a new object class to be used in JavaScript. The JS code can use 'new' JS operator to create an instance of that class, "<OBJECT CLASSID=otv_module_uri DECLARE></OBJECT>"

In this example, the otv_module_uri points to an Open TV code module. This code module is preferably in accordance with the JS class object module definition. The H2O layer preferably makes sure that this .otv module is loaded before starting any JS script from that page.

For linkage, at runtime JS2O asks H2O for the address of that module, using the class name. The class name is built-in the Open TV code module (passed at compile time to JS2O). See also js2o_compile_add_class. A unique ID identifies a DOM element. e.g., <anchor id ="foo" . . . >, <src="xxx.otv" id="glop">.

DOM elements are accessed in JS code as regular global variables using that ID name. In both cases, the object is created by H2O, not JS2O. Linkage: at compile time, H2O registers this element with JS2O, which returns a handle. This handle is used at runtime by H2O to tell JS2O the address of that object.

JS2O provides its own data types (int, bool, float, objects, etc), which are not the standard C types. The generic C type for a JavaScript value is 'js2o_val'. It includes all the other JS types: js2o_int: Integer value, js2o_float: Float value, js2o_bool: Boolean value, and js2o_ptr: pointer to objects, strings, etc.

For fast and efficient execution, the present invention provides a single 32-bit word to represent all JS2O data types in the stack. The following are the 6 basic types for all JS2O variables. Any JS2O value is preferably compatible with one of the 6 basic types. All types passed by value fit into this single 32 bit data, for simplicity.

The preferred float format is: seeeeeeeefffffffffffffffffffffff with: 1-bit s is sign bit. 0 means positive, 1 means negative. 8-bit e is exponent field. The exponent bias is 127. The 23-bit f is fraction field. This means the preferred float uses a 22-bit fraction field, instead of 23. Macros are defined in the software appendix.

All JS object classes share common structure. The object structure definitions start with the same fields, and all the vtable of the classes start with the same primary functions. For fast access to the JS2O APIs and the methods, the compiler knows the structure of all gadgets or at least the beginning of the structure. Because of the preferred Ocode 'vcall' opcode, a virtual table pointer is the first field of that structure. The vtable itself contains the address of all functions mandatory for each gadget, possibly followed by addresses of functions specific to that class. JS2O runtime also needs a type, and a 'prototype' pointer into each gadget structure. A start definition for JS2O objects if provided in the software appendix. The vtable points to an array of mandatory functions for any JS2O object class. The mandatory functions are provided in the software appendix.

Those APIs are only called by the JS compiler internals in a C-like context. Some parameters are C types (e.g., int index, char *name), some are JS2O types (e.g., 'this' and return values). Note that the order of the parameters reflects the order used by the JS compiler.

The following vtable functions are provided:

The js2o_val GetProperty (js2o_obj *this, char *name) function returns the property value of the specified property. It returns JS2O_UNDEFINED if the property exists, but has no defined value. It returns JS2O_NULL if the property does not exist. This function does not look through the prototype pointer, this will be done automatically by the JS2O runtime engine, if necessary. This function can assume that the 'prototype' property is handled directly by the JS2O compiler. However, the ValueOf and ToString properties are handled by this function. See also ValueOf and ToString API below. If the property corresponds to a method, the return value is a function js2o type.

A gadget class can decide to only support some of the well-known property names, and only with a literal name. In that case, the properties are accessed with the GetNumberProperty/SetNumberProperty APIs, and the GetProperty API returns JS2O_UNDEFINED.

Name is preferably a property name. If the object is an array type, 'name' can also be the index in the array. It is an index if the name represents a valid string number (e.g., "1"). In case the object supports array and the name is an index, this function returns the corresponding item number.

The void SetProperty (js2o_obj *this, char *name, js2o val value) function sets the specified property with value. If the property does not exist, the gadget can either create it (with that value) or simply do nothing. This function returns no value. This function can assume that the 'prototype' property is handled directly by the JS2O compiler, however, the ValueOf and ToString properties are handled by this function.

Name is usually a property name. If the object is an array type, 'name' can also be the index in the array. It is an index if the name represents a valid string number (e.g., "1"). In case the object supports array and the name is an index, this function should set the corresponding item number, and update its 'length' property (if appropriate).

The void *GetMethod (js2o_obj *this, char *name) function returns the function address of this method. If this property does not exist, or does not contain a function, a runtime exception is raised (see js2o_runtime_error). The method returns a js2o_val value. The method is called with the following arguments: js2o_obj *this, js2o_int nbarg, js2o_val arg1, . . . js2o_val argN: Name is usually a property name. If the object is an array type, 'name' can also be the index in the array. It is an index if the name represents a valid string number (e.g., "1"). In case the object supports array and the name is an index, this function returns the function address corresponding to the item number.

The js2o_val GetIndexPropertyName (js2o_obj *this, int index) function returns the name of the property/method with that index (0 to N). This function returns JS2O_NULL if the property/method does not exist. Else it returns a JS2O string value. This function is mainly used by the 'for/in' JavaScript statement. This function assumes that it is called in a sequence of indexes: 0, 1, 2 . . .

The js2o_val ValueOf (js2o_obj *this) function returns the value of an object. The value of an object is object specific. The type returned can be a number, Boolean, string, function or even object. This API is a shortcut for GetProperty (this, "ValueOf") then a call to that method.

The js2o_str ToString (js2o_obj *this) function returns the string representation of the object value. This function is a shortcut for GetProperty (this, "ToString') then a call to that method.

The void * GetCall (js2o_obj *this) function returns the address of a function to be executed. This is called normally for Function objects only. Calling this for other objects can be considered a runtime error. See, js2o_runtime_error. For a function, this API is a shortcut for Valueof( )+get address of function.

The void DeleteProperty (js2o_obj *this, char *name) function deletes the property specified. If the property does not exist or cannot be deleted, nothing happens.

The void MarkProperties (js2o_obj *this, int markvalue) function is used by the JS2O garbage collector to mark all js2o_val values referenced by this gadget (except the one from 'prototype' field which is done automatically by the JS2O engine). In most cases, the js2o_val values are simply the ones stored in the gadget properties. The gadget calls js2o_mark_val function to mark each js2o_val. Failure to do can result in the j s2o_val (still referenced by the gadget) to be freed.

The js2o_val GetNumberProperty (js2o_obj *this, int property_number) function is the same as the GetProperty, except that a property number is specified instead of a property name. This API is used for predefined objects with predefined properties. The property number comes from a list of well-known names.

The void SetNumberProperty (js2o_obj *this, int property_number, js2o_val value) function is the same as the SetProperty, except that a property number is specified instead of a property name. This API is used for predefined objects with predefined properties. The property number comes from a list of well-known names.

The void *GetNumberMethod (js2o_obj *this, int property_number) function returns the function address of this method. If this property does not exist, or does not contain a function, a runtime exception is raised (see js2o runtime_error).

The void DeleteObject (js2o_obj *this) function frees all resources internally allocated by the object. This is opposite of the object_new function of the object class. This function frees the object itself. The Garbage Collector calls this function when an object is found as being no longer used. The gadgets methods are normally accessed through the GetMethod API. The gadget returns the function address.

Each method is executed in a JS2O context. Each method is implemented with the following restrictions: Each input parameter is of type 'js2o_val', not regular C type. A return value is mandatory (can be JS2O_NULL). The return value has also to be a js2o type, and each method has at least the following first two parameters: 'this' object pointer and the number of parameters passed. For example, a JS2O method "foo" with two parameters x and y can be declared in C as: js2o_val foo (js2o_obj *this, js2o_int nbarg, js2o_val x, js2o_val y, . . . );

When defining an external object or an external object class, it is possible to declare some predefined properties and methods.

A predefined "vtable" method is defined by name and by an index. The index is the function number in the vtable of the class. Because of required functions at the beginning of any vtable, the first available index is 13. The compiler will optimize, when possible, access to those predefined methods. When defining an object, e.g., OSD, with a predefined function, e.g., show, the JS code "OSD.show( );" will be optimized (but not "x.show( );" even if x equals OSD.).

JS2O+H2O defines a list of well-known property names. Each name is associated with a string number. The compiler optimizes access to those well-known properties by calling the GetNumberProperty and SetNumberProperty API of the object. If a method is not defined as a 'predefined vtable method', it can still be one of the well-known property names. In that case the compiler optimizes the get method address by calling the GetNumberMethod API. When accessing that method as a property, the compiler uses the GetNumberProperty and SetNumberProperty API.

If a method can also be defined as a 'predefined global method'. The method is a global function, which implements the method. That function checks that the object class is right for that method, and then performs the actual functionality. An error is generated if the object belongs to a wrong class. The list of 'predefined global methods' is well known shared by all H2O components. The address of those methods is passed at runtime by H2O (single array of addresses).

There is a list of well-known property names. This list is known by the compiler and by the objects. This list includes most (if not all) of the property (and method) names of the predefined objects (including DOM objects). This list is only used for methods and properties accessed by the compiler, but not for other strings.

In order to optimize the access to CSS properties, a well-known property name can include the '.' character. For example, "style.color" can be declared as a single property name. JS2O runtime includes garbage collection for dynamically created objects and dynamically created strings. A Mark & Sweep mechanism is implemented for garbage collection. This is less costly in terms of runtime speed than Reference Counters.

Garbage collection preferably also keeps track of modules (class definition, external code modules) referenced by the strings and objects (e.g., vtable, functions, static string, etc). Persistent objects will provide reset functions to cleanup external references when changing pages (i.e., unloading modules).

H2O provides a memory manager, for example for caching modules. JS2O and its garbage collector work hand in hand with H2O. JS2O allocates many small chunks (objects, strings), while H2O allocates a few larger chunks. JS2O provides an idle function to H2O to be executed while nothing happens (no user input). This idle function calls the garbage collection.

Functions names: access to functions defined in the same file is optimized into direct call to the function address. This means in particular, the function cannot be changed dynamically. Local variables are compiled into direct slots in the stack. Global variables are compiled into direct variables in the Data Section memory. All predefined objects are part of the JS global scope. Predefined objects are referenced directly, as well as their predefined methods and properties. The window object and all its properties/methods are directly part of the global scope. For example, "window.document" property can be accessed simply by "document".

The main JS code and all JS event-handlers (for a page) are compiled into a single code module. The H2O layer calls an initialization function of that module. This initialization function returns a JS2O context pointer.

js2o_cx *js2o_cx_create (void *module, int DOMObjectHandle, js2o_obj DOMObjects, js2o_obj PredefinedObjects, void GlobalMethods);

The parameters are a pointer to the main module and pointers to created DOM objects (handles and addresses), a pointer to an array of predefined object addresses and a pointer to an array of predefined global functions. The DOM object handles are the handles returned by js2o_compile_add_element. This function returns NULL if error.

The 'module' parameter preferably points to the same data as the one returned by js2o_compile_generate. JS2O does not make a copy of that data, so it preferably stays valid until the destroy function removes it. Note also that this data is read-only (JS2O does not write into that data). Note that at least the "window" object is defined.

The JS2O context is destroyed (when no longer needed) by calling js2o_cx_destroy: void js2o_cx_destroy (js2o_cx *context);

To execute the main JS code, the H2O layer calls the following API: int js2o_main (js2o_cx *context);

This function returns 0 if no error, or a negative number for runtime error. To execute an event-handler, the H2O layer calls the following API to execute the handler: int js2o_execute (js2o_cx *context, js2o_obj *this, int handle);

The handle value is provided by the js2o_compile_add_src API at compile time. The function js2o_execute returns the following values: JS2O_TRUE if the handler returns true, JS2O_FALSE if the handler returns false, JS2O_NULL if a runtime error occurs, any js2o_val if no error and the handler does not return a value. Note that the JS execution engine is preferably not reentrant. In a preferred embodiment, the function js2o_main and js2o_execute cannot be called while another JS handler is executing.

An external JS file is compiled into an Open TV DLL code module. The H2O layer calls an initialization function of that module. This initialization function receives as input the context of JS2O. Thus, the main JS code module is initialized first as follows: intjs2o_dll_init (js2o_cx *context, char *name, void *module). The name parameter is the one passed at compile time (in js2o_compile_add_bin). After this call, the functions defined in that module are available to the JS context. The external JS code module also has an API to execute the global JS statements of this file. In a preferred embodiment, the external JS code module is an Open TV Code module with JS2O specific information stored in the Open TV module header. The Object Class Module defines a new class of objects. This module is declared in the HTML page with the OBJECT declaration, and declared to the compiler using the js2o_compile_add_class API. The JS2O engine calls the following C API, provided by this module, to get the function constructor of that object class.

The js2o_obj *module_class_get_constructor (js2o_cx *context, char *classname): function is exported function #0. The Object Class Module, in a preferred embodiment, is an Open TV Code module with JS2O specific information stored in an Open TV module header.

JS runtime accesses the following function provided by the H2O runtime framework: js2o_obj * h2o_get_class_constructor (js2o_cx *context, char *classname).

This function preferably returns the function constructor object for the class specified. The class name is the same value as the one passed in the CLASSID of the OBJECT declaration. This function internally locates the class module and calls the module_class_get_constructor function. The following statement is available for JS to create an object of an external class. The name is the same as the one specified on the one passed in the CLASS ID of the OBJECT declaration. The following C APIs are available for developing object classes and libraries. A void js2o_runtime_error (js2o_cx *context) function is executed when a runtime error occurs inside a gadget method or vtable function, and inside js2o libraries, when an error condition occurs. The char *js2o_get number_property_string (int propertyNumber) function returns the string associated with the well-known property number.

The present invention has been described in interactive television in a preferred embodiment, however, the present invention may also be embodied in a distributed computer system comprising a server and a client device. In another embodiment, the present invention is implemented as a set of instructions on a computer readable medium, comprising ROM, RAM, CD ROM, Flash or any other computer readable medium, now known or unknown that when executed cause a computer to implement the method of the present invention.

While a preferred embodiment of the invention has been shown by the above invention, it is for purposes of example only and not intended to limit the scope of the invention, which is defined by the following claims.

What is claimed is:

1. A computer readable medium containing instructions that when executed by a computer cause the computer to:
   receive at a server a markup language page containing at least one script;
   extract from the markup language page only those portions of the script with an associated keyword which indicates the corresponding portion will be executed at the client device, each of said one or more portions comprising less than the entire script compile only the extracted portions of the script into a client compatible code for execution at a client device;
   transmit the compiled portions of the script to the client device; and
   execute the compiled portions of the script at the client device.

2. The medium of claim 1 further comprising instructions that when executed by a computer cause the computer to:
   gather multiple script page elements for a language from the markup language page into at least one package; and
   pass the at least one package of gathered script page elements to a script compiler so that the multiple script page elements for the markup language page are compiled together.

3. The medium of claim 1 further comprising instructions that when executed by a computer cause the computer to:
   cache compiled scripts for markup language pages;
   check an incoming markup language page script to determine if the incoming page script is already in the cache;
   if a compiled version of the incoming markup language page script is not found in the cache, compile and cache a compiled version of the incoming markup language page script; and
   if the compiled version of the incoming markup language page script is found in the cache, retrieve the compiled version of the incoming markup language page script from the cache and send the compiled version of the incoming markup language page script to the client device.

4. The medium of claim 1 further comprising instructions that when executed by a computer cause the computer to:
   compile the script for the received markup language page into an intermediate format; and
   compile the intermediate format into the client compatible code.

5. The medium of claim 1 further comprising instructions that when executed by a computer cause the computer to:
   generate a script element tree in the server; and
   generate client compatible opcodes from the script element tree.

6. The medium of claim 5, further comprising instructions that when executed by a computer cause the computer to:
   send the client compatible opcodes to a binary assembler for assembly of an assembled representation.

7. The medium of claim 6 further comprising instructions that when executed by a computer cause the computer to:
   generate at least one client-compatible code module from the assembled representation; and
   pass the client compatible code module to the client device for execution.

8. The medium of claim 1 further comprising instructions that when executed by a computer cause the computer to:
   compile a single copy of a first script which is included in multiple markup language pages; and
   send the single compiled copy of the first script to the client for use as a shared external object by the multiple markup language pages.

9. The medium of claim 1 further comprising instructions that when executed by a computer cause the computer to:
   provide an interface for defining a predefined object.

10. The medium of claim 9 wherein the predefined object comprises at least one of an on screen display and channels.

11. The medium of claim 1 further comprising instructions that when executed by a computer cause the computer to:
    provide a client-compatible object model script interface to manipulate client-defined objects.

12. The medium of claim 1, further comprising instructions that when executed by a computer cause the computer to:
    extract and gather scripts for a language from the markup language page, wherein only scripts that will be executed at the client device are extracted and gathered;
    pass the gathered scripts to a script compiler for compiling;
    cache the compiled gathered scripts in a compiled script cache;

check an incoming markup language page script to determine if the incoming markup language page script is in the compiled script cache;

if a compiled version of the incoming markup language page script is not found in the compiled script cache, compile and cache a compiled version of the incoming markup language page script in the compiled script cache; and if the compiled version of the incoming markup language script is found in the compiled script cache, retrieve the compiled version of the incoming markup language script from the compiled script cache and send the compiled version of the incoming markup language script to the client device; and execute the compiled version of the incoming markup language script at the client device.

13. The medium of claim 1 further comprising:

generate a script element tree and generating client-compatible opcodes from the script element tree, compile the incoming script for the markup language page into an intermediate format and then compile the intermediate format into client compatible code;

send the client compatible op codes to a binary assembler for assembly of a assembled representation; and generate a client-compatible code module from the assembled representation for execution at the client device.

14. The medium of claim 1 further comprising instructions that when executed by a computer cause the computer to:

compile a single copy of a first script which is included in multiple markup language pages and send the single compiled copy of the first script to the client device for use as OR a shared external object by multiple HTML markup language pages;

provide an interface for defining predefined objects, wherein a predefined object is at least one of an on screen display or channels; and provide a client-compatible object model script interface to manipulate client-defined objects.

15. The medium of claim 1 wherein the markup language page is sent from a head end to the server.

16. The medium of claim 15 wherein the markup language is part of an ecommerce transaction between a service provider and the user at the client device.

17. A method for compiling a script for execution on a client device in a distributed computer system comprising:

receiving at a server a markup language page containing at least one script;

extracting from the markup language page only those portions of the script with an associated keyword which indicates the corresponding portion will be executed at the client device, each of said one or more portions comprising less than the entire script;

compiling only the extracted portions of the script into a client compatible code for execution at a client device;

transmitting the compiled portions of the script to the client device; and executing the compiled portions of the script at the client device.

18. The method of claim further comprising:

gathering multiple script page elements for a language from the markup language page into at least one package;

passing the at least one package of gathered script page elements to a script compiler so that multiple script page elements for the markup language page are compiled together.

19. The method of claim 17 further comprising:

caching the compiled script for the markup language page;

checking an incoming markup language page script to determine if the incoming page script is already in the cache;

if a compiled version of the incoming markup language page script is not found in the cache, compiling and caching a compiled version of the incoming markup language page script; and if the compiled version of the incoming markup language page script is found in the cache, retrieving the compiled version of the incoming markup language page script from the cache and sending the compiled version of the incoming markup language page script page to the client device.

20. The method of claim 17 further comprising:

compiling the script for the received markup language page into an intermediate format; and compiling the intermediate format into the client compatible code.

21. The method of claim 17 further comprising:

generating a script element tree in the server; and generating client compatible opcodes from the script element tree.

22. The method of claim 21 further comprising:

sending the client compatible opcodes to a binary assembler for assembly of a assembled representation.

23. The method of claim 22 further comprising:

generating at least one client-compatible code module from the assembled representation; and passing the client compatible code module to the client device for execution.

24. The method of claim 17 further comprising:

compiling a single copy of a first script which is included in multiple markup language pages; and sending the single compiled copy of the first script to the client for use as a shared external object by the multiple markup language pages.

25. The method of claim 17 further comprising:

providing an interface for defining a predefined object.

26. The method of claim 25 wherein the predefined object comprises at least one of an on screen display and channels.

27. The method of claim 17 further comprising:

providing a client-compatible object model script interface to manipulate client-defined objects.

28. The method of claim 17 further comprising:

extracting and gathering scripts for a language from the markup language page, wherein only a scripts that will be executed at the client device are extracted and gathered;

passing the gathered scripts to a script compiler for compiling;

caching the compiled gathered scripts in a compiled script cache;

checking an incoming markup language page script to determine if the incoming markup language page script is in the compiled script cache;

if a compiled version of the incoming markup language page script is not found in the compiled script cache, compiling and caching a compiled version of the incoming markup language page script in the compiled script cache; and if the compiled version of the incoming markup language script is found in the compiled script cache, retrieving the compiled version of the incoming markup language script from the compiled script cache and sending the compiled version of the incoming markup language script to the client device; and executing the compiled version of the incoming markup language script at the client device.

29. The method of claim 17 further comprising:
generating a script element tree and generating client-compatible opcodes from the script element tree,
compiling the incoming script for the markup language page into an intermediate format and then compiling the intermediate format into client compatible code,;
sending the client compatible op codes to a binary assembler for assembly of a assembled representation; and
generating a client-compatible code module from the assembled representation for execution at the client device.

30. The method of claim 17 further comprising:
compiling a single copy of a first script which is included in multiple markup language pages and sending the single compiled copy of the first script to the client device for use as a shared external object by multiple markup language pages;
providing an interface for defining predefined objects, wherein a predefined object is at least one of an on screen display or channels; and
providing a client-compatible object model script interface to manipulate client-defined objects.

31. The method of claim 17 wherein the markup language page is sent from a head end to the server.

32. The method of claim 31 wherein the markup language page is part of an ecommerce transaction between a service provider and the user at the client device.

33. The medium of claim 1, further comprising instructions that cause the computer to:
bind at compile time a script variable name to a memory location which will contain the variable name value at run time on the client device.

34. The medium of claim 1, further comprising instructions that cause the computer to:
bind at compile time a script variable name to a value for execution at run time at the client device.

35. The method of claim 17 further comprising instructions that cause the computer to:
binding at compile time a script variable name to a memory location which will contain the variable name value at run time on the client device.

36. The method of claim further comprising:
binding at compile time a script variable name to a value for execution at run time at the client device.

37. An apparatus for compiling scripts for execution on a client device in a distributed computer system comprising:
a server memory for receiving a markup language page containing at least one script;
an extraction component for extracting from the script only those portions of the script with an associated keyword which indicates the corresponding portion will be executed at the client device, each of said one or more portions comprising less than the entire script;
a compiler component for compiling only the extracted portions of the script into a client compatible code for execution at a client device;
a communication link for transmitting the compiled portions of the script to the client device; and a client device for executing the compiled portions of the script.

38. The apparatus of claim 37 further comprising:
a program component for gathering multiple script page elements for a language from the markup language page into at least one package; and
a memory for storing gathered script page elements for access by the script compiler so that the script page elements for the markup language page are compiled together.

39. The apparatus of claim 37 further comprising:
a cache for caching compiled scripts for markup language pages;
the compiler further comprising a program component for checking an incoming markup language page script to determine if the incoming page script is already in the cache;
if a compiled version of the incoming markup language page script is not found in the cache, compiling and caching a compiled version of the incoming markup language page script; and
if the compiled version of the incoming markup language page script is found in the cache, retrieving the compiled version of the incoming markup language page script from the cache and sending the compiled version of the incoming markup language page script to the client device.

40. The apparatus of claim 37 further comprising:
a compiler component for compiling the script for the received markup language page into an intermediate format; and
a compiler component for compiling the intermediate format into the client compatible code.

41. The apparatus of claim 37 further comprising:
memory for containing a script element tree in the server; and
a program component for generating client compatible opcodes from the script element tree.

42. The apparatus of claim 41 further comprising:
a binary assembler for receiving the client compatible opcodes to a binary assembler for assembly of a assembled representation.

43. The apparatus of claim 42 further comprising:
at least one client-compatible code module generated from the assembled representation for passing to the client device for execution.

44. The apparatus of claim 37 further comprising:
a single compiled copy of a first script which is included in multiple markup language pages for sending to the client for use as a shared external object by multiple markup language pages.

45. The apparatus of claim 37 further comprising:
an interface for defining a predefined object.

46. The apparatus of claim 45 wherein the predefined object comprises at least one of an on screen display and channels.

47. The apparatus of claim 37 further comprising:
a client-compatible object model script interface to manipulate client-defined objects.

48. The apparatus of claim 37 further comprising a program component for:
extracting and gathering scripts for a language from the markup language page, wherein only scripts that will be executed at the client device are extracted and gathered; and passing the gathered scripts to a script compiler for compiling;

storing the compiled gathered scripts in a compiled script cache; and checking an incoming markup language page script to determine if the incoming markup language page script is in the compiled script cache;

if a compiled version of the incoming markup language page script is not found in the compiled script cache, compiling and caching the markup language page script in the compiled script cache; and if the compiled version of the incoming markup language script is found in the compiled script cache, retrieving the compiled version of the incoming markup language script from the compiled script cache and sending the compiled version of the incoming markup language script to the client device for execution.

49. The apparatus of claim 37 further comprising:

a script element tree for generating a client-compatible opcodes from the script element tree, an intermediate format component for compiling the incoming script for the markup language page into the intermediate format and then compiling the intermediate format into client compatible code;

a binary assembler for assembly for assembly of the client compatible op codes to of an assembled representation for generation of a client-compatible code module from the assembled representation for execution at the client device.

50. The apparatus of claim 37 further comprising: compiling a single copy of a first script which is included in multiple markup language pages and sending the single compiled copy of the first script to the client device for use as a shared external object by the multiple markup language pages;

providing an interface for defining predefined objects, wherein a predefined object is at least one of an on screen display or channels; and providing a client-compatible object model script interface to manipulate client-defined objects.

51. The apparatus of claim 37 wherein the markup language page is sent from a head end to the server.

52. The apparatus of claim 51 wherein the markup language is part of an ecommerce transaction between a service provider and the user at the client device.

53. The apparatus of claim 37 further comprising:

a compiler component for binding at compile time a script variable name to a memory location which will contain the variable name value at run time on the client device.

* * * * *

UNITED STATES PATENT AND TRADEMARK OFFICE
CERTIFICATE OF CORRECTION

PATENT NO. : 7,065,752 B2  Page 1 of 1
APPLICATION NO. : 10/061902
DATED : June 20, 2006
INVENTOR(S) : Pierre Willard It is certified that error appears in the above-identified patent and that said Letters Patent is hereby corrected as shown below:

Column 23,

Line 35, please delete "use as OR a shared external object by multiple HTML" and substitute --use as a shared external object by multiple HTML--

Column 24,

Line 53, please delete "wherein only a scripts that will" and substitute --wherein only scripts that will--

Signed and Sealed this

Fourteenth Day of November, 2006

JON W. DUDAS
*Director of the United States Patent and Trademark Office*